United States Patent
Jung et al.

(10) Patent No.: US 10,613,998 B2
(45) Date of Patent: Apr. 7, 2020

(54) MULTI-LEVEL TIME DECAY STORAGE QUEUE

(71) Applicant: EMC IP Holding Company LLC, Hopkinton, MA (US)

(72) Inventors: Jaeyoo Jung, Shrewsbury, MA (US); Owen Martin, Hopedale, MA (US); Sichao Zhu, Natick, MA (US); Krishna Deepak Nuthakki, Bangalore (IN); Benjamin A. Randolph, Uxbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/049,064

(22) Filed: Jul. 30, 2018

(65) Prior Publication Data
US 2020/0034316 A1    Jan. 30, 2020

(51) Int. Cl.
*G06F 13/16*    (2006.01)
*G06F 9/48*    (2006.01)

(52) U.S. Cl.
CPC ........ *G06F 13/1642* (2013.01); *G06F 9/4818* (2013.01)

(58) Field of Classification Search
CPC .... G06F 9/4881; G06F 9/3855; G06F 9/4843; G06F 9/5066; G06F 3/126
USPC .................. 718/102–105; 710/310
See application file for complete search history.

(56) References Cited

U.S. PATENT DOCUMENTS

| | | | | |
|---|---|---|---|---|
| 4,885,780 A * | 12/1989 | Gopal | ...................... | H04Q 3/66 379/221.01 |
| 5,561,456 A * | 10/1996 | Yu | ...................... | H04N 7/17327 348/E7.072 |
| 5,677,899 A * | 10/1997 | Getreuer | .............. | G11B 5/5526 369/44.28 |
| 6,249,807 B1 * | 6/2001 | Shaw | ...................... | H04L 51/14 709/206 |
| 6,707,905 B2 * | 3/2004 | Lenard | .................... | G06Q 10/06 379/266.01 |
| 6,724,768 B1 * | 4/2004 | Melvin | .................. | H04L 47/283 370/412 |
| 6,745,262 B1 * | 6/2004 | Benhase | ............... | G06F 9/4881 710/36 |
| 8,310,696 B2 * | 11/2012 | Gustafson | .............. | G06Q 10/06 358/1.15 |

(Continued)

*Primary Examiner* — Faisal M Zaman
(74) *Attorney, Agent, or Firm* — Muirhead and Saturnelli, LLC

(57) ABSTRACT

Techniques for processing I/O operations may include: receiving an I/O having an associated expected execution time (EET) and I/O service level; selecting, in accordance with the EET and service level of the I/O, a first I/O queue from multiple pending I/O queues; inserting the I/O into the first I/O queue; and performing I/O shifting. I/O shifting may include shifting I/Os from one pending I/O queue to another that is ranked immediately higher than the one pending I/O queue. The multiple I/O queues may be ranked from a highest priority queue to a lowest priority queue. I/O shifting may shift I/Os from the highest priority queue to execution and shifting I/Os from another queue into the highest priority queue. I/O shifting is subject to remaining credits available of the multiple I/O queues and time distance between source and target queues.

20 Claims, 17 Drawing Sheets

(56) References Cited

U.S. PATENT DOCUMENTS

| | | | |
|---|---|---|---|
| 8,549,526 B2* | 10/2013 | Yamamoto | G06F 9/4881 718/102 |
| 8,997,107 B2* | 3/2015 | Jain | G06F 9/46 709/223 |
| 9,268,605 B2* | 2/2016 | Wang | G06F 9/50 |
| 9,602,450 B1* | 3/2017 | Kushnir | H04L 51/16 |
| 10,078,520 B1* | 9/2018 | Chirayath Kuttan | G06F 9/3855 |
| 10,133,797 B1* | 11/2018 | Mishra | G06F 16/254 |
| 2003/0198238 A1* | 10/2003 | Westby | H04L 49/90 370/402 |
| 2004/0088443 A1* | 5/2004 | Tran | G06F 13/4027 710/1 |
| 2005/0058065 A1* | 3/2005 | Tiller | H04L 47/10 370/229 |
| 2006/0248250 A1* | 11/2006 | Sarkar | G06F 13/364 710/243 |
| 2007/0116027 A1* | 5/2007 | Ciavaglia | H04Q 11/0066 370/412 |
| 2009/0187534 A1* | 7/2009 | Broll | G06F 16/217 |
| 2010/0082855 A1* | 4/2010 | Accapadi | G06F 13/362 710/39 |
| 2011/0035749 A1* | 2/2011 | Krishnakumar | G06F 9/4881 718/102 |
| 2012/0221810 A1* | 8/2012 | Shah | G06F 13/16 711/158 |
| 2013/0117755 A1* | 5/2013 | Bontempi | G06F 9/5027 718/103 |
| 2015/0089506 A1* | 3/2015 | Takasu | G06F 9/46 718/102 |
| 2015/0150016 A1* | 5/2015 | Kim | G06F 9/4881 718/103 |
| 2016/0205054 A1* | 7/2016 | Lu | H04L 51/32 709/206 |
| 2019/0130327 A1* | 5/2019 | Carpenter | G06N 20/00 |

* cited by examiner

MULTI-LEVEL TIME DECAY STORAGE QUEUE

BACKGROUND

Technical Field

This application generally relates to data storage and, in particular, I/O processing with multiple pending I/O queues.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell EMC™. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of processing I/Os comprising: receiving an I/O having an associated expected execution time (EET) and I/O service level; selecting, in accordance with the EET and service level of the I/O, a first of a plurality of pending I/O queues, wherein the plurality of pending I/O queues has a ranking from a highest priority queue of the plurality of pending I/O queues to a lowest priority queue of the plurality of pending I/O queues; responsive to said selecting, inserting the I/O into the first queue; and performing I/O shifting for at least one of the plurality of pending I/O queues, wherein said I/O shifting for the at least one pending I/O queue includes shifting one or more I/Os from the at least one pending I/O queue to another one of the plurality of pending I/O queues that is ranked immediately higher than the at least one pending I/O queue. The I/O may perform a data access operation with respect to data of a target logical device having a service level objective, and wherein the I/O service level may be determined as the service level objective of the target logical device. Each of the plurality of pending I/O queues may be associated with a different time to expiry (TTE) denoting a maximum wait time before which I/Os of said each queue are scheduled for execution or servicing, and wherein each of the plurality of pending I/O queues may have an amount of remaining credits (RC) of said each queue available for consumption. Selecting may include: selecting an initial queue of the plurality of pending I/O queues in accordance with the service level objective and the TTE associated with the initial queue; determining whether the initial queue has an associated RC that is greater than or equal to the EET of the I/O and an associated TTE that is greater than or equal to the EET of the I/O; and if it is determined the initial queue does have an associated RC that is greater than or equal to the EET of the I/O and an associated TTE that is greater than or equal to the EET of the I/O, determining the initial queue as the first queue wherein said inserting inserts the I/O into the initial queue and decreasing the associated RC of the initial queue in accordance with the EET of the I/O. The method may include: if it is determined the initial queue does not have an associated RC that is greater than or equal to the EET of the I/O and an associated TTE that is greater than or equal to the EET of the I/O, traversing remaining queues of the plurality of pending I/O queues in accordance with the ranking of the plurality of pending I/O queues to determine the first queue having an associated RC that is greater than or equal to the EET of the I/O and an associated TTE that is greater than or equal to the EET of the I/O; and decreasing the RC of the first queue in accordance with the EET of the I/O inserted into the first queue. Performing I/O shifting may include: shifting one or more I/Os from the highest priority queue of the plurality of pending I/O queues to one or more threads that execute the one or more I/Os from the highest priority queue; and for each of the I/O more I/Os shifted out of the highest priority queue, decreasing the RC of the highest priority queue in accordance with one or more EETs respectively associated with the one or more I/Os shifted out of the highest priority queue. A sum of the one or more EETs associated with the one or more I/Os shifted out of the highest priority queue may not exceed a maximum TTE value of the highest priority queue. A second of the plurality of pending I/O queues may be ranked immediately lower than the highest priority queue in accordance with the ranking. Performing I/O shifting may include: shifting one or more I/Os from the second queue to the highest priority queue; and for each of the I/O more I/Os shifted out of the second queue and into the highest priority queue, decreasing the RC of the second queue in accordance with one or more EETs respectively associated with the one or more I/Os shifted out of the second queue and increasing the RC of the highest priority queue in accordance with the one or more EETs respectively associated with the one or more I/Os shifted out of the second queue. A distance may denote a time difference between a first TTE of the second queue and a second TTE of the highest priority queue. A sum of the one or more EETs associated with the one or more I/Os shifted out of the second queue may not exceed the distance. A sum of the one or more EETs associated with the one or more I/Os shifted out of the second queue may not exceed the RC of the highest priority queue.

In accordance with another aspect of techniques herein is a system comprising: a processor; and a memory comprising code stored thereon that, when executed, performs a method of processing I/Os comprising: receiving an I/O having an associated expected execution time (EET) and I/O service level; selecting, in accordance with the EET and service level of the I/O, a first of a plurality of pending I/O queues, wherein the plurality of pending I/O queues has a ranking from a highest priority queue of the plurality of pending I/O queues to a lowest priority queue of the plurality of pending I/O queues; responsive to said selecting, inserting the I/O into the first queue; and performing I/O shifting for at least one of the plurality of pending I/O queues, wherein said I/O shifting for the at least one pending I/O queue includes shifting one or more I/Os from the at least one pending I/O queue to another one of the plurality of pending I/O queues that is ranked immediately higher than the at least one pending I/O queue.

In accordance with another aspect of techniques herein is a computer readable medium comprising code stored thereon that, when executed, performs a method of processing I/Os comprising: receiving an I/O having an associated expected execution time (EET) and I/O service level; selecting, in accordance with the EET and service level of the I/O, a first of a plurality of pending I/O queues, wherein the plurality of pending I/O queues has a ranking from a highest priority queue of the plurality of pending I/O queues to a lowest priority queue of the plurality of pending I/O queues; responsive to said selecting, inserting the I/O into the first queue; and performing I/O shifting for at least one of the plurality of pending I/O queues, wherein said I/O shifting for the at least one pending I/O queue includes shifting one or more I/Os from the at least one pending I/O queue to another one of the plurality of pending I/O queues that is ranked immediately higher than the at least one pending I/O queue. The I/O may perform a data access operation with respect to data of a target logical device having a service level objective, and wherein the I/O service level may be determined as the service level objective of the target logical device. Each of the plurality of pending I/O queues may be associated with a different time to expiry (TTE) denoting a maximum wait time before which I/Os of said each queue are scheduled for execution or servicing, and wherein each of the plurality of pending I/O queues may have an amount of remaining credits (RC) of said each queue available for consumption. Selecting may include: selecting an initial queue of the plurality of pending I/O queues in accordance with the service level objective and the TTE associated with the initial queue; determining whether the initial queue has an associated RC that is greater than or equal to the EET of the I/O and an associated TTE that is greater than or equal to the EET of the I/O; and if it is determined the initial queue does have an associated RC that is greater than or equal to the EET of the I/O and an associated TTE that is greater than or equal to the EET of the I/O, determining the initial queue as the first queue wherein said inserting inserts the I/O into the initial queue and decreasing the associated RC of the initial queue in accordance with the EET of the I/O. The method may include: if it is determined the initial queue does not have an associated RC that is greater than or equal to the EET of the I/O and an associated TTE that is greater than or equal to the EET of the I/O, traversing remaining queues of the plurality of pending I/O queues in accordance with the ranking of the plurality of pending I/O queues to determine the first queue having an associated RC that is greater than or equal to the EET of the I/O and an associated TTE that is greater than or equal to the EET of the I/O; and decreasing the RC of the first queue in accordance with the EET of the I/O inserted into the first queue. Performing I/O shifting may include: shifting one or more I/Os from the highest priority queue of the plurality of pending I/O queues to one or more threads that execute the one or more I/Os from the highest priority queue; and for each of the I/O more I/Os shifted out of the highest priority queue, decreasing the RC of the highest priority queue in accordance with one or more EETs respectively associated with the one or more I/Os shifted out of the highest priority queue. A sum of the one or more EETs associated with the one or more I/Os shifted out of the highest priority queue may not exceed a maximum TTE value of the highest priority queue.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
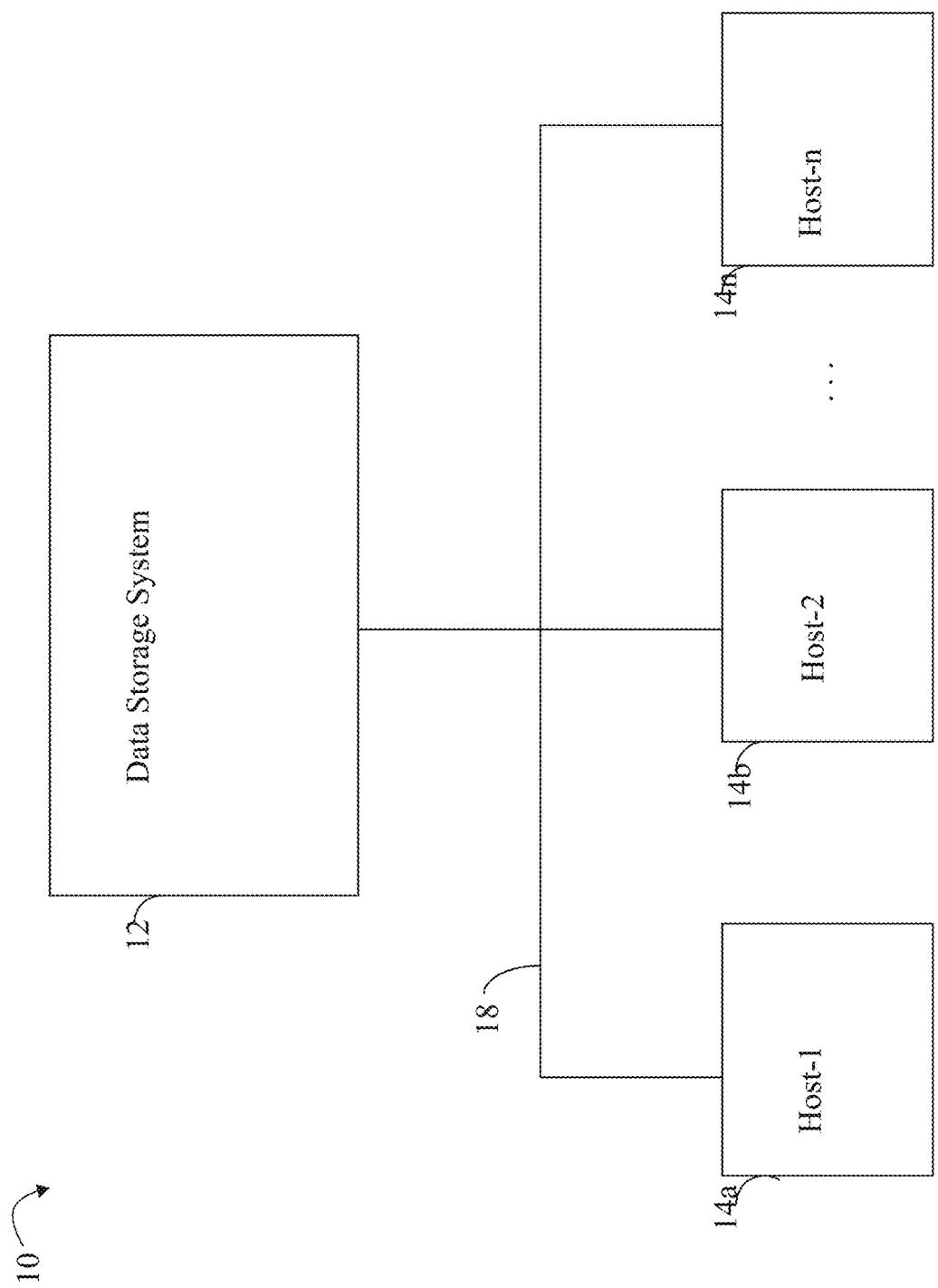
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Dell EMC™'s Symmetrix® VMAX® data storage system, as well one or more other data storage systems as may vary with the embodiment.

Figure 2A:
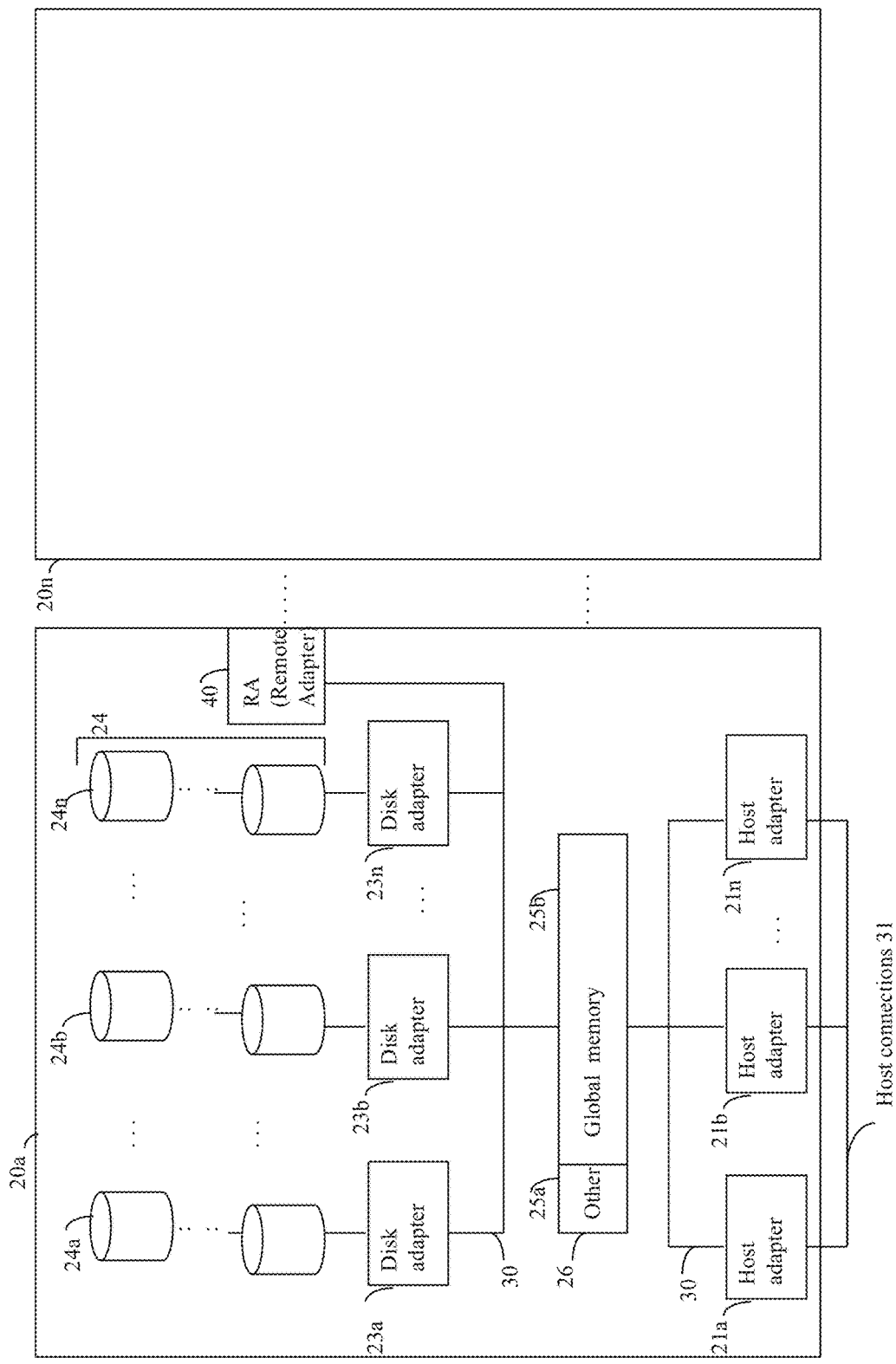
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by Dell EMC™., a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Figure 2B:
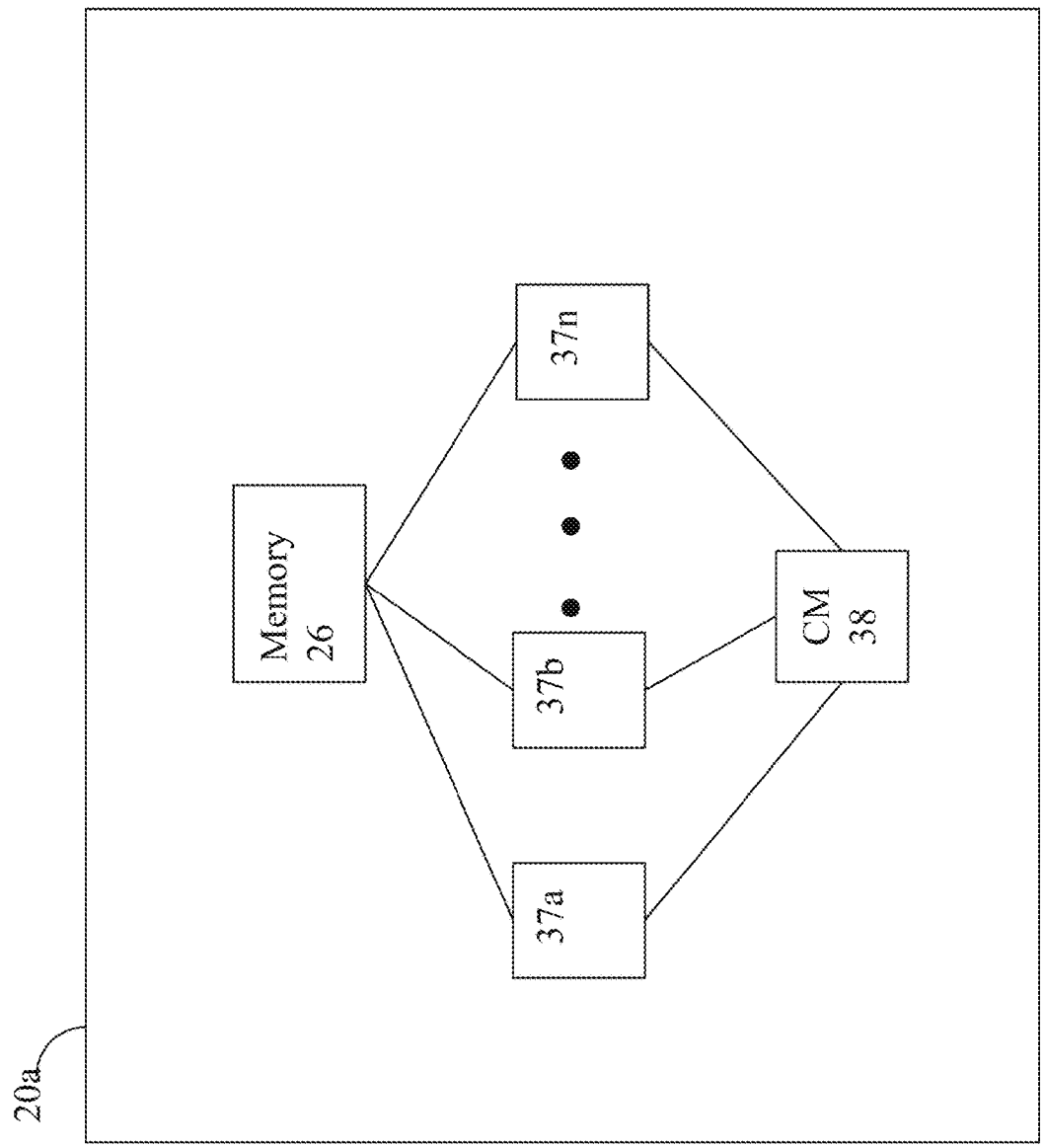
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide a multi-tenant (MT) environment whereby multiple tenants store their data on the data storage system. In such an exemplary MT environment, a different service level objective or SLO may be specified for each tenant that defines a guaranteed performance level for the tenant. For example, an SLO may be related to a guaranteed level of performance with respect to I/O operations serviced at the data storage system. In this case, the SLO specified may be expressed in terms of one or more metrics, such as based on response time (RT). For example, the SLO specified for the tenant may include an average response time (RT) with respect to I/Os issued by the tenant. To further illustrate, an SLO may specify an average RT of 3 milliseconds (ms.) for the tenant whereby the tenant is guaranteed to have an average RT of 3 ms. for each LUN storing the tenant's data. The tenant may also be referred to as a consumer of the data storage system having its data stored on the data storage system. A single tenant or consumer may be, for example, an application executing on a host. A single host may have one or more applications. In at least one embodiment, an SLO may be specified for each logical group of one or more LUNs, such as a storage group (SG) of LUNs used by one or more applications.

Additionally, although examples and illustrations herein may refer to a RT specified as an SLO, it should be noted that an SLO may be specified using one or more other metrics other than RT. For example, I/O related SLOs may be specified in terms of guaranteed I/O throughput (e.g., I/O rate such as I/Os per second), data throughput (e.g., megabytes per second), and the like. An SLO, such as the RT SLO described herein, may be applied on a per LUN level (e.g., guaranteed for each LUN individually).

If an SLO is not being met whereby the average measured or observed RT exceeds the SLO specified RT, such an occurrence may also be referred to herein as an SLO violation. As just noted, an embodiment may define an SLO violation as described above where the measured performance is worse than as specified by the SLO metric. It should be noted that an embodiment may also more generally define an SLO violation as obtaining a first value for a performance metric, such as average RT, based on observed or measured performance values where the first value deviates more than a threshold amount from a specified SLO value for the performance metric. For example, the SLO may specify an average RT of 3 ms. An SLO violation may be determined if the average RT (as determined from observed RT values) deviates more than 0.5 ms. from the 3 ms. Thus, an SLO violation may be determined if the average RT based on such measured performance is outside of the RT range 3 ms.+/−0.5 ms. or outside the inclusive range of 2.5 ms. through 3.5 ms. An embodiment may specify the deviation threshold amount, such as 0.5 ms, as a percentage of the specified SLO metric value 3 ms., or as a numeric quantity (e.g., real number). Thus, as described in more detail elsewhere herein, an SLO violation may also occur in some embodiments if the measured or observed performance is better than as specified in the SLO. Responsive to an SLO violation, remediation processing may be performed to attempt to alleviate, and, if possible, eliminate, the SLO violation. Any suitable technique may be used to remove or alleviate the SLO violation. For example, remediation processing may be performed to increase I/O performance of an application when the measured RT is greater than the specified SLO RT. For example, if the SG of LUNs has a measured average RT of 5 ms. and an SLO of 3 ms, processing may be performed to increase performance of I/Os directed to such LUNs of the SG such as by allocating additional resources for use by the I/Os directed to the SG LUNs, storing or moving the data of the SG LUNs on higher performance physical storage (e.g., migrating or movement of the LUN data to flash-based storage devices), increasing processing priority of pending I/Os directed to such SG LUNs (e.g., giving such pending I/Os directed to the SG LUNs higher priority relative to priority of other pending I/Os directed to other SGs), and the like.

In at least one embodiment, an SLO may be assigned to each defined logical SG of one or more LUNs, as noted above, where each/every I/O directed to any LUN of the SG has the same SLO (as specified for the SG).

In at least one embodiment described herein for purposes of illustration, SLOs may be specified using the following service levels, from highest service or performance level to lowest service or performance level: DIAMOND (highest), PLATINUM, GOLD, SILVER, BRONZE (lowest). Each of the foregoing service levels may have an associated SLO such as a specified RT goal. For example, DIAMOND may have a 1 millisecond RT goal, PLATINUM may have a 4 ms. RT goal, GOLD may have an 8 millisecond RT goal, SILVER may have a 10 millisecond RT goal, and BRONZE may have a 16 millisecond RT goal. Also as noted, each of the foregoing service levels may have an associated target range with a minimum and maximum RT. It should be noted that other embodiments may have additional and/or different service levels than as noted above and used elsewhere herein for purposes of illustration.

In at least one existing system not using technique herein, I/Os waiting for service may be placed in a single I/O list. Each I/O may have an associated timeout period, as well as possibly other information. The timeout period may indicate by when the I/O should be executed. I/Os with higher priority are assigned shorter timeout periods than other I/Os with lower priority having higher timeout periods. In such an existing system, processing may be performed to traverse the single list and periodically adjust the timeout periods of the I/Os in the list based on the actual amount of time that has elapsed. Additionally, the list is traversed to select the I/Os that are to be executed at different points in time based on the timeout periods associated with the I/Os of the list. With such an existing system, the amount of CPU time consumed may be excessive due to the length of the I/O list that is traversed periodically. Additionally, the amount of CPU time and other resources consumed in connection with maintaining the list and selecting I/Os for servicing may vary with the number of pending I/Os in the list. Thus, if there is a burst of I/Os where the number of I/Os in the list increases, system performance may be adversely affected due to the amount of CPU resources consumed processing and maintaining the I/O list. Additionally, a target execution time of an I/O as denoted by its timeout period may be missed due to the amount of time it takes to traverse the list in search of I/Os that should be executed at different points in time based on the timeout periods of the I/Os. Since the amount of resources consumed in connection with the I/O list may vary with the length, actual observed I/O performance may have an undesirable amount of variance or deviation so that the I/O performance may not be sufficiently consistent to meet expected performance targets.

Accordingly, techniques are described in following paragraphs that provide for more consistent I/O response times, or more generally, consistent I/O performance such as in connection with meeting specified performance targets denoting by SLOs. Additionally, such techniques described herein provide for improved efficiency of data storage system resource consumption and thus improved system performance. Described in following paragraphs are techniques that use multiple queues for pending I/Os (waiting to be serviced) based on SLO and/or priority associated with each I/O. Received I/Os are queued for servicing in one of the queues. I/Os in the highest priority queue are executed prior to I/Os of the next higher priority queue. The foregoing and other aspects of techniques herein are described in more detail below.

In at least one embodiment in accordance with techniques herein, to provide different response times to I/Os directed to different SGs with different SLOs and also execute the I/Os based on associated I/O priority, multiple queues of pending I/Os may be utilized where the multiple queues may also be referred to as a Multi-level Time Decay Storage Queues (MTDSQs). MTDSQs is a group of multi-thread safe queues. Each of the queues has an associated Time to Expiry or Expire (TTE) and an amount of Remaining Credits (RC). TTE of a queue indicates the maximum wait time before which the I/Os of the queue are scheduled for execution or servicing. The highest priority queue of all the queues has the lowest TTE of all queues, and the lowest priority queue of all the queues has the highest TTE of all queues. In at least one embodiment, each of the queues may be maintained as a doubly linked list of I/Os. As I/Os are placed into the different queues, an RC value is maintained for each queue where the RC value of a queue generally is reduced each time an I/O is added to the queue. The RC value for a queue indicates how many more I/Os can be placed in the queue. Thus an RC value of 0 for a queue indicates all credits of the queue have been consumed and no more I/O can be placed in the queue at the current point in time. As I/Os are removed or shifted out of a queue, the RC value of the queue accordingly increases. Time decay may denote the amount of time that has progressed or elapsed, such as measured by system time. Both RC values and TTE values for the queues may be decreased based on the time decay or elapsed time. The foregoing and other aspects of processing performed in an embodiment are described in more detail below.

Figure 3A:
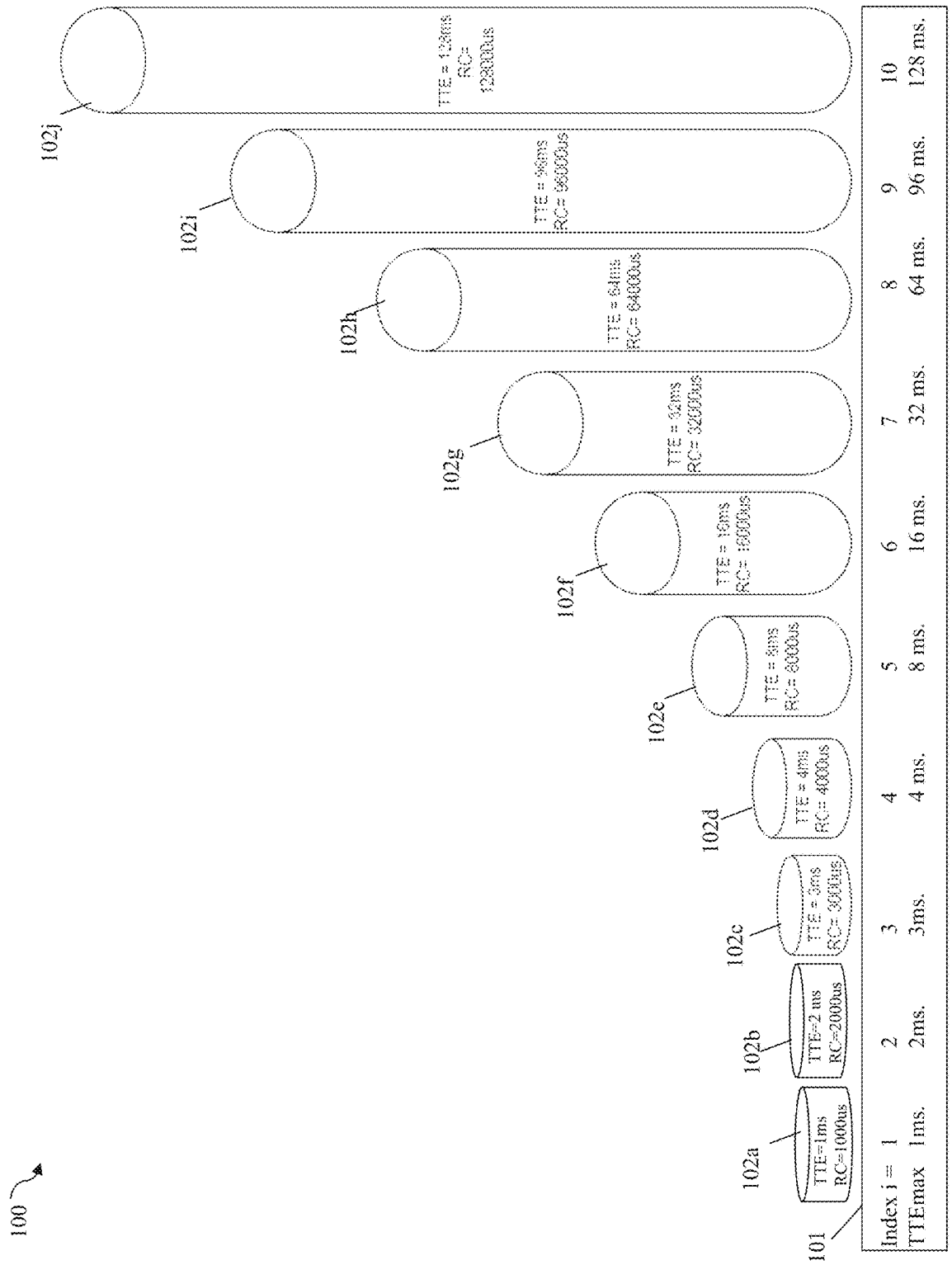
FIGS. 3A, 3B, 4, 5, 6, 7, 8, 9, 9B, 10 and 11 are examples illustrating processing that may be performed in an embodiment in accordance with techniques herein.

Referring to FIG. 3A, shown is an example 100 of multiple queues for pending I/Os that may be used in an embodiment in accordance with techniques herein. The example 100 includes 10 queues 102*a-j* with particular values for TTE and initial RC values. More generally, an embodiment may include any suitable number of queues having different TTE and initial RC values than as in FIG. 3A.

The example 100 includes queues 102*a-j* illustrating an initial state of the queues, such as prior to receiving any I/Os at the data storage system (e.g., immediately after booting the system). Each of the queues 102*a-j* has an associated TTEmax, current TTE and current RC. Each of the queues 102*a-j* has a different TTEmax as denoted by 101 discussed below. The RC values associated with each of the queues 102*a-j* in FIG. 3A denote initial values for the RCs of the queues 102*a-j*. As mentioned above and described elsewhere herein, the current RC value for a queue varies over time such as based on elapsed time or time decay and also as I/Os are placed and removed from the queue. In the initial state or starting point as in FIG. 3A, the RC value of each queue is equal to the TTE value the queue and the current TTE value may be the TTEmax of the queue. Generally, when there are no I/Os in a particular one of the queues, the TTE and RC values of a queue may be equal.

Element 101 denotes an index "i" and TTEmax value that may be specified for each of the queues 102*a-j*. As denoted by 101, each of the queues 102*a-j* may have an associated index value "i" used in below equations where i is an integer in [1,10] in this example (e.g., queue 102*a* has i=1; queue 102*b* has i=2; queue 102*c* has i=3; queue 102*d* has i=4; queue 102*e* has i=5; queue 102*f* has i=6; queue 102*g* has i=7; queue 102*h* has i=8; queue 102*i* has i=9; and queue 102*j* has i=10). Additionally, element 101 identifies a TTEmax for each queue which represents the maximum or largest TTE value for that particular queue. In one aspect, all the TTEmax values of 101 may be viewed as a vector or array of TTEmax values where the lowest index is associated with the highest priority queue (index=1) and the highest index is associated with the lowest priority queue (index=10, and each of the queue's 102*a-j* TTEmax may also be expressed as TTEmax(i) for a particular queue having an associated indexvalue "i". In the example 100, queue 102*a* has TTEmax(1)=1 ms; queue 102*b* TTEmax=2 ms; queue 102*c* has TTEmax=3 ms; queue 102*d* has TTEmax=4 ms; queue 102*e* has TTEmax=8 ms; queue 102*f* has TTEmax=16 ms; queue 102*g* has TTEmax=32 ms; queue 102*h* has TTEmax=64 ms; queue 102*i* has TTEmax=96 ms; and queue 102*j* has TTEmax=128 ms. The TTE values in 102*a-j* may denote current TTE values associated with a point in time or current state as represented in the example 100. The TTE values denoting the current TTEs for the queues 102*a-j* change over time as described herein based on the time decay or amount of elapsed time. The RC values for queues 102*a-j* change over time as described herein based on the time decay or amount of elapsed time and also changes over time depending on the I/Os that may be currently placed in the queues 102*a-j*. At startup as in FIG. 3A, all queues 102*a-j* may have current TTE and RC values equal to their respective TTEmax values of 101.

Due to the typical granularity of time for I/O execution or service, the RC values and TTE values are provided in different units in this example. In FIG. 3A, the TTE values are in milliseconds (e.g., ms., 1×10-3 seconds) and RC values are in microseconds (e.g., μs, $1 \times 10^{-6}$ seconds). The queues also have associated relative priority where 102*a-j* denotes a ranking from highest priority to lowest priority based on the different TTE values associated with the queues 102*a-j*. The priority ranking of 102*a-j*, from highest priority queue 102*a* to lowest priority queue 102*j*, is based on increasing sorted order of TTE values for the queues. The TTEs of the queues decrease as time progresses based on the system clock.

In the example 100, queue 102*a* has a TTE of 1 ms. and an initial RC value of 1000 μs.; queue 102*b* has a TTE of 2 ms. and an initial RC value of 2000 μs.; queue 102*c* has a TTE of 3 ms. and an initial RC value of 1000 μs.; queue 102*d* has a TTE of 4 ms. and an initial RC value of 4000 μs.; queue 102*e* has a TTE of 8 ms. and an initial RC value of 8000 μs.; queue 102*f* has a TTE of 16 ms. and an initial RC value of 16000 μs.; queue 102*g* has a TTE of 32 ms. and an initial RC value of 32000 μs.; queue 102*h* has a TTE of 64 ms. and an initial RC value of 64000 μs.; queue 102*i* has a TTE of 96 ms. and an initial RC value of 96000 μs.; and queue 102*k* has a TTE of 128 ms. and an initial RC value of 128000 μs.

When an I/O is received at the data storage system, the I/O is assigned an expected execution time (EET) denoting the amount of time it is expected to take to execute or complete servicing the I/O. The EET may vary with one or more attributes or properties of the I/O. For example, the EET may vary with I/O type such as whether the I/O is a read (R) or write (W), the size of the I/O (e.g., larger R I/Os may have larger EETs than smaller R I/Os; larger W I/Os may have larger EETs than smaller W I/Os), and the like. The EET associated with the different I/O types and sizes may be determined in any suitable manner. For example, in at least one embodiment, EET values may be determined based on historical information of observed amount of times to perform reads and writes of varying sizes. The EET may be expressed in units of time, such as a number of milliseconds.

For an I/O received at the data storage system, the I/O may be placed in selected one of the queues 102*a-j* based on an I/O service level determined based on one or more attributes of the I/O. For example, in at least one embodiment, the I/O service level used to select one of the queues 102*a-j* into which the I/O is placed may be determined in accordance with an SLO and/or an I/O priority of the I/O. In at least one embodiment, the I/O service level may denote a target I/O RT for the I/O.

An I/O received at the data storage system is directed to a target logical device of an SG, where the SG may have an associated SLO, such as DIAMOND, GOLD, and the like, as discussed elsewhere herein. Each of the SLOs has an associated performance target or goal including an average I/O RT target. For example, DIAMOND may have an average I/O RT target of 1 ms. In at least one embodiment, the I/O may assigned an associated target I/O RT, and thus, I/O service level, based on the SLO of the SG including the target logical device. Thus, an I/O directed to a target logical device of an SG having a DIAMOND SLO may be assigned an I/O service level of 1 ms. The 1 ms. target I/O service level of the I/O may be used in initially selecting one of the queues 102a-j into which the I/O is placed.

An I/O received at the data storage system may have an associated priority, such as based on the host application that generated the I/O. For example, in at least one embodiment, an I/O may have an associated priority within the inclusive range [1,15], where 1 denotes the highest I/O priority and 15 denotes the lowest I/O priority. The I/O priority of a received I/O may be communicated in any suitable manner. In at least one embodiment, the received I/O may be tagged with the I/O priority where the host or application may place a tag denoting the I/O priority in the I/O command. Each of the I/O priorities may denote an I/O RT target goal in a manner similar to the different SLOs. For example, an I/O priority of 1 may denote and I/O RT goal of 1 ms. where the I/O may be assigned an I/O service level of 1 ms. (in accordance with the 1 ms. denoted by the I/O priority of 1).

It should be noted that in some embodiments, an I/O may have both an I/O priority and an associated SLO and any suitable technique may be used to determine the I/O service level based on the combination of I/O priority and associated SLO. For example, in at least one embodiment, if both an I/O priority and an SLO are specified for an I/O, then the I/O may be placed in a queue having a higher queue priority than the queue that would otherwise be selected based on SLO. For example, with reference to FIG. 3 and assuming there are sufficient credits available in all queues, assume that queue 102d would be selected for an I/O based on the I/O's SLO. Now assume that both I/O priority and SLO are specified for the I/O. In this case, the I/O may be alternatively placed in queue 102c that is a single level higher in terms of priority relative to queue 102d.

Thus, in at least one embodiment, a received I/O has an associated I/O service level that is a target I/O RT, such as a number of milliseconds. As denoted by 101, each of the queues 102a-j may have an associated index value "i" used in below equations where i is an integer in [1,10] in this example (e.g., queue 102a has i=1; queue 102b has i=2; queue 102c has i=3; queue 102d has i=4; queue 102e has i=5; queue 102f has i=6; queue 102g has i=7; queue 102h has i=8; queue 102i has i=9; and queue 102j has i=10).

Consistent with the example 100, the following EQUATION 1 may denote the 10 TTE MAX values of element 101 in ms. (e.g., TTEmax values) for the 10 queues, respectively, 102a-102j:

TTEmax values={1,2,3,4,8,16,32,64,96,128}        EQUATION 1

Where

Each of the TTEmax values on the right hand side of EQUATION 1 are sequentially ordered and associated, respectively, with "i" values [1, 10]; and TTEmax(i) denotes a particular "$i^{th}$" one of the above TTE values on the right hand side of EQUATION 1 associated with the particular one the queues 102a-j having the index "i". For example TTEmax[10] of EQUATION 1 is 128 and associated with the 10th queue which is 102j of FIG. 3A.

As noted above, a received I/O has an associated I/O service level and an EET. When an I/O is placed in a queue, the current RC of the queue may be decreased by the EET of the I/O. The TTE of the queue decreases as time progresses or elapses (e.g., time decay) such as based on the system clock. Additionally, the RC of each queue decreases as time progresses or elapses (e.g., time decay) such as based on the system clock, where such decrease may be have maximum possible value that varies with each queue (e.g., as described elsewhere herein $\Delta T_i$ stands for time decay (e.g., elapsed time) of queue "i", where once $\Delta T_i$ for queue "i" reaches Max $\Delta T_i$, $\Delta T_i$ is reset to 0, whereby for that time period, no time is deducted from RCi of the queue due to the time decay). The RC values of the queues 102a-j may not be allowed to go below 0 in connection with processing herein.

The following EQUATIONs 2A and 2B may be used to express the RC of the "$i^{th}$" queue, without I/Os (e.g., when there are no I/Os in the queue) such as is the state of all the queues 102a-j in FIG. 3A:

$$\text{Max } \Delta T_i = \begin{cases} 1 \text{ ms}, & i \in \{1, 2, 3, 4\} \\ TTE_i - TTE_{i-1}, & i > 4 \end{cases} \quad \text{EQUATION 2A}$$

$$RC_i = TTE_i - \Delta T_i \quad \text{EQUATION 2B}$$

Where

RCi denotes the remaining credit of queue "i" or "$i^{th}$" queue (e.g., as in FIG. 3A);

"i" denotes the index of the "$i^{th}$" queue (e.g., as in FIG. 3A);

TTEi is the TTEmax(i) value based on EQUATION 1 for the "$i^{th}$" queue;

Max $\Delta T_i$ stands for the total time decay value of "i"; and $\Delta T_i$ stands for time decay (e.g., elapsed time) of queue "i". Once $\Delta T_i$ for queue "i" reaches Max $\Delta T_i$, $\Delta T_i$ is reset to 0.

To further illustrate, assume that FIG. 3A denotes the state at a first point in time when there are no I/Os queued in 102a-j. Let a second point in time subsequent to the first point in time occur 100 microseconds (µs) later, so that $\Delta T$=100 µs. The example 150 of FIG. 3B may denote the state of the system at the second point in time where there are no I/Os in the queues 102a-j (e.g., no I/Os have been received since the first point in time) and time has elapsed (time decay) by $\Delta T$=100 µs. Based on the above, the RC and TTE values for all the queues 102a-j are decreased by $\Delta T$=100 µs. However, since no I/Os have been received during the time period $\Delta T$=100 µs. and the queues 102a-j remain empty (e.g., no shifting of I/Os among queues as discussed below), no RC values are decreased due to placement of I/Os in the queues.

For a received I/O having an I/O service level, processing is performed to determine into which of the queues 102a-j to place the I/O. Processing may place the I/O into one of the queues 102a-j in accordance with the I/O service level of the I/O. For example, processing may initially select a first queue based on the I/O service level of the I/O and may then attempt to place the I/O into the selected first queue if possible based on the RC and TTE of the selected first queue and based on the EET of the I/O. The first queue selected may be a particular one of the queues having a TTEmax that matches, equals, or is sufficiently close to (e.g., within a specified threshold or tolerance), the target I/O RT denoted by the I/O service level of the I/O.

Figure 3B:
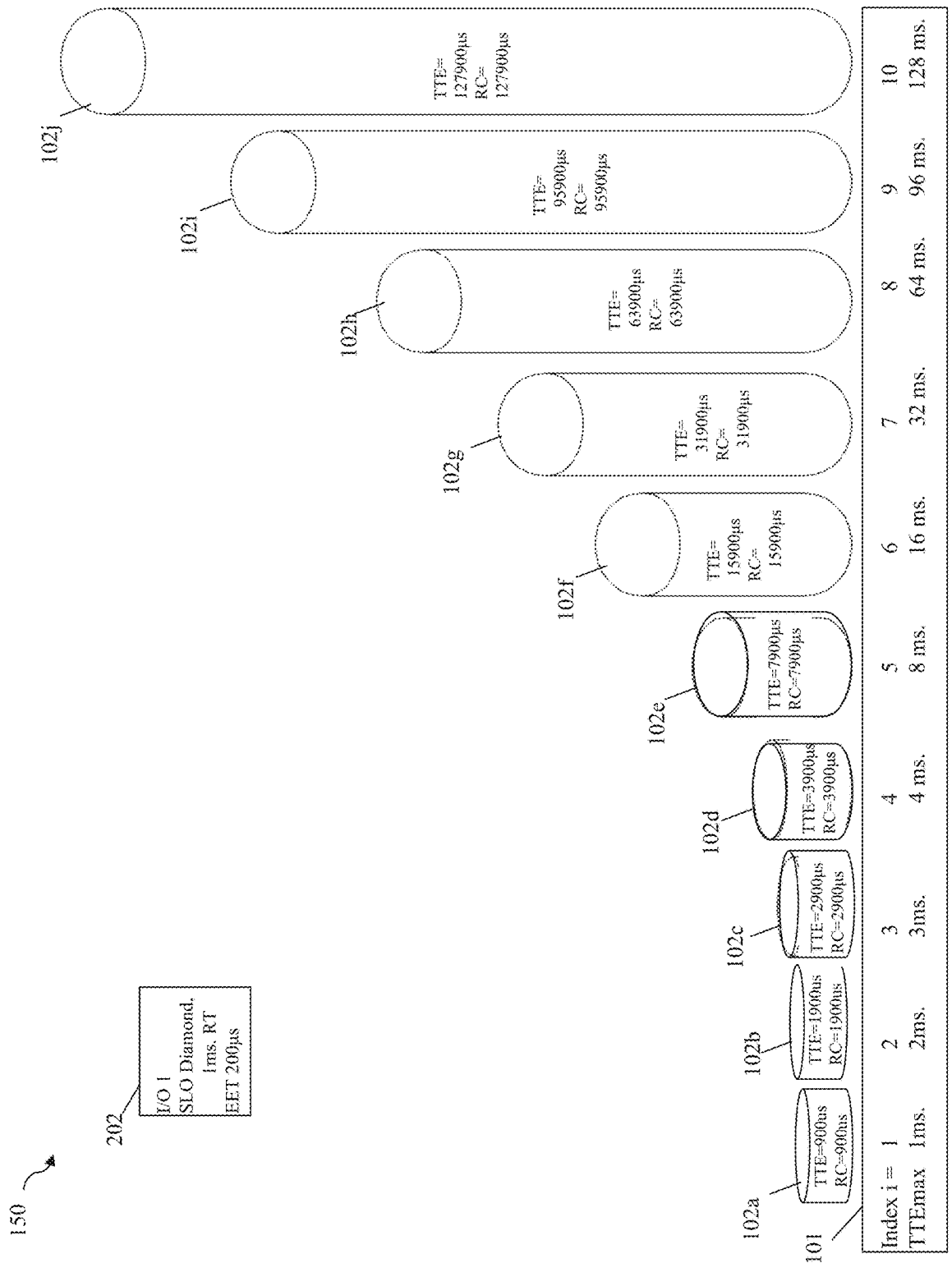
Figure 4:
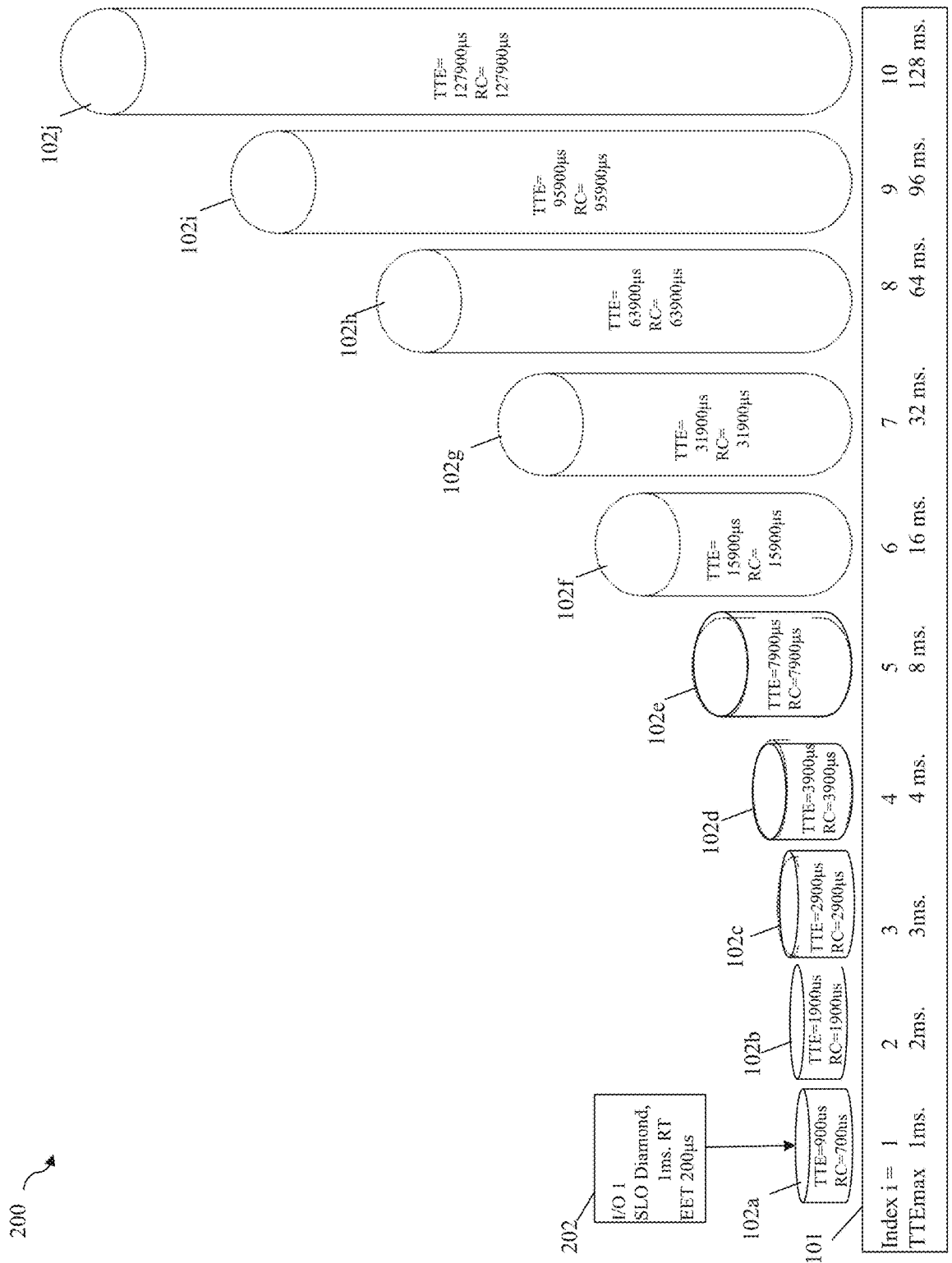

For example with reference to FIG. 3B and FIG. 4, assume an I/O 202 is received when the system has a state as denoted in FIG. 3B. The received I/O 202 has an SLO of DIAMOND with a 1 ms. RT target, and where the I/O has an EET of 200 μs. DIAMOND may be the highest SLO level and thus processing may first attempt to place the I/O in the the I/Os EET to see if the selected initial queue has sufficient credits (e.g, in terms of its current TTE and RC values) for the I/O to be placed in this queue. When I/O is received, processing generally searches for the queue for placement of the I/O where the queues RC and TTE values are larger than the I/Os EET, as expressed in EQUATION 3 below:

$$I/O \text{ insert entry} = \begin{cases} i, \text{ where } TTEmax(i) = I/O \text{ service level, } RC_i \geq I/O \text{ EET and} \\ \quad TTEi \geq I/O \text{ EET}, \\ n, \forall n \in \{i+1, \ldots t\}, RC_n \geq I/O \text{ EET and } TTEn \geq I/O \text{ EET} \end{cases} \quad \text{EQUATION 3}$$

highest priority queue 102a, having a TTEmax of 1 ms. Processing now determines whether the I/O can be placed in the queue 102a in accordance with the current RC and TTE of the queue 102a and in accordance with the EET of the I/O. The I/O can be placed in the queue 102a if both the queue's current RC and TTE values are greater than or equal to (e.g., ≥) the EET of the I/O. In this example, queue 102a has current RC=900 μs. and current TTE=900 μs. and thus the I/O (having EET=200 μs.) can be placed in queue 102a. As illustrated by the example 200 of FIG. 4, the I/O 202 is placed in queue 102a and the RC of the queue 102a is reduced by 200 μs., the EET of the inserted I/O 202. As a result, as illustrated in FIG. 4 after inserting the I/O 202, queue 102a may have an RC=700 μs. (e.g., subtract 200 μs. (the I/O EET) from 900 μs. (the RC of the queue before insertion)). All other queues 102b-j have TTEs and RCs as in FIG. 3B with no modification due to the I/O insertion. As a result of inserting I/O 202 into queue 102a, the queue 102a's TTE is not modified (e.g., 102a has same current TTE in FIG. 3B (prior to insertion of 202 into queue 102a) and as in FIG. 4 after insertion of 202 in queue 102a).

Generally, if a queue's TTE is greater than or equal to (e.g., the EET of the I/O and the queue's RC is greater than or equal to (e.g., ≥) I/O's EET, then the I/O is placed in the queue and the queue's RC is reduced by the I/O's EET. In case the queue's current TTE or RC is less than the I/O's EET, then processing may be repeated with respect to the next lower priority queue to see if its TTE and RC are both greater than the I/O's EET. The foregoing may be repeated sequentially across queues of lower priority until a queue is located which has TTE and RC greater than I/O's EET (where the I/O is then placed in the queue having a TTE and RC greater than or equal to the EET of the I/O). If processing does not locate any such queue having a TTE and RC greater than the EET of the I/O, the I/O may be placed in a default queue which may be the lowest priority queue 102j in the system from which I/Os are executed. For example, in connection with I/O 202, queue 102a did not have current RC and TTE values larger than or equal to 200 μs., processing may continue to sequential search queues 102b-b, in order of decreasing priority, to locate the queue with the highest priority of all queues 102a meeting the qualifying placement conditions where the selected queue has current RC and TTE values larger than 200 μs. (e.g., EET of I/O 202).

Consistent with the above description and illustration regarding selection and placement of I/O 202 in queue 102a, when an I/O with an SLO and/or priority is received from a client, such as a host, processing identifies an initial queue into which the I/O may be placed for execution based on comparing and matching the I/O's service level with the TTEmax of the queue. Subsequently, the current TTE and RC values of the selected initial queue may be compared to Where I/O EET denotes the I/O's expected execution time (EET);

I/O insert entry denotes the index (e.g., one of the values in the range [1-10] for example herein in FIGS. 3, 3A, 4) of the selected queue into which the received I/O is placed where the selected queue has sufficient RC and TTE values which are greater than or equal to the I/O's EET;

"i" denotes the index of the "$i^{th}$" queue (e.g., as in FIGS. 3A, 3B and 4);

"n" denotes the nth queue after queue "i" (e.g. of lower priority that queue "i") having sufficient current TTE and RC values (e.g., sufficient credit) for placement of I/O based on I/O's EET; and "t" denotes total number of queues.

Note that in connection with examples and discussions herein, it is assumed that there will be sufficient RC and TTE values of the lowest priority queue 102j into which the received I/O may be inserted. Otherwise, an error condition may result.

Figure 5:
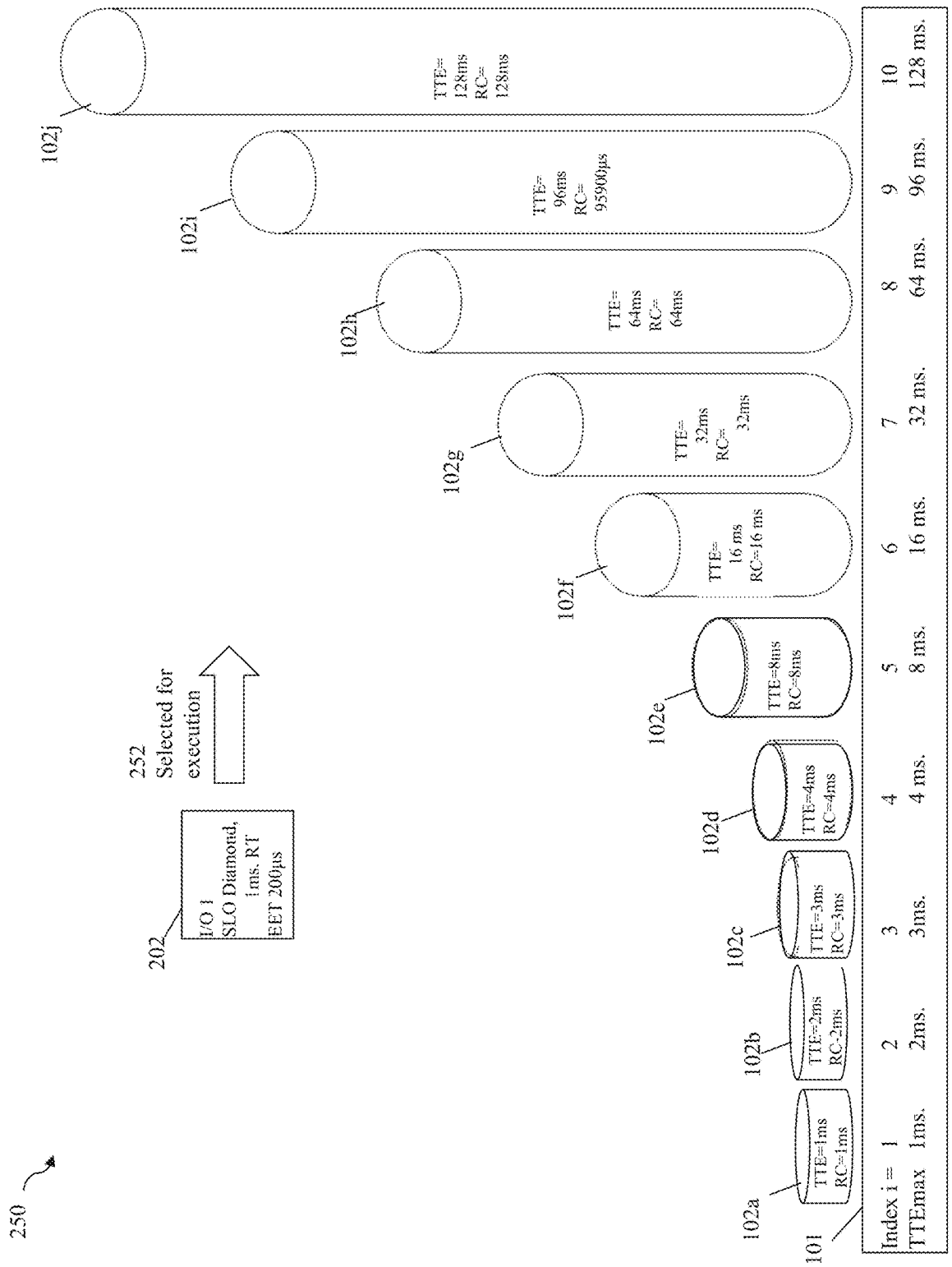

Assume now at a third point in time with reference to FIGS. 4 and 5, another 900 μs elapses making the total time decay $\Delta T_i$ to be 1 ms. where the current TTE of the highest priority queue 102a becomes zero and is now considered expired. When the current TTE of the highest priority queue 102a expires by having the current TTE of 102a becomes zero, the TTE values of all queues are reinitialized to their corresponding TTEmax values of EQUATION 1 This is illustrated by the revised TTE values of the queues 102a-j in FIG. 5. Additionally, I/O shifting is performed. In connection with I/O shifting, the I/Os of the highest priority queue 102a having the expired current TTE=0 are now removed from 102a for execution as denoted by 252. Also as part of I/O shifting, processing is performed to attempt to shift I/Os in a current priority queue to a next higher priority queue. Such shifting from a lower to a higher priority queue is illustrated and described in more detail below and is subject to certain constraints or conditions based on the current RC and TTE values of the queues as well as a running timer associated with each of the queues 102a-j to track the time before which to shift I/Os in a particular queue to the next higher priority queue. In this manner, I/O shifting is performed to periodically shift I/Os in an incremental manner from the lower to the higher priority queues until the I/Os eventually reach the highest priority queue 102a where they are selected for execution. As I/Os are shifted in and out of different ones of the queues 102a-j, the current RC values of the queues 102a-j are recalculated in an ongoing manner based on the I/Os present in the queues 102a-j as a result of the I/O shifting.

Referring back to the third point in time noted above with a the total time decay $\Delta T_i$=1 ms., the current TTE of the highest priority queue 102a becomes zero and is now considered expired. Consistent with discussion above, responsive to TTE of 102a becoming zero, all TTEs of all queues 102a-j are initialized to their respective TMAX values of EQUATION1; and I/O 202 is selected 252 for execution leaving no pending I/Os in the queues 102a-j. The RC values of the queues 102a-j are updated to reflect that no I/Os are in any of the queues 102a-j consistent with EQUATIONS 2A and 2B above. More generally, in connection with I/O shifting, the RC values of the queues 102a-j are further reduced by a number of consumed RC credits based on the EET values of I/Os in the queues 102a-j. Thus, consistent with discussion herein and providing a more generalized formulation of EQUATIONS 2A and 2B above, the current RC values for queues 102a-j including pending I/Os may be expressed as:

$$\text{Max } \Delta T_i = \begin{cases} 1 \text{ ms}, & i \in \{1, 2, 3, 4\} \\ TTE_i - TTE_{i-1}, & i > 4 \end{cases}$$

EQUATION 4A (same as EQUATION 2A)

$$RC_i = TTE_i - \Delta T_i - \sum_{j=1}^{n} IO_{in\ i} EET_j$$

EQUATION 4B

Where

RCi, "i", TTEi, Max $\Delta T_i$ and $\Delta T_i$ are as in EQUATIONs 2A and 2B;

Once $\Delta T_i$ reaches Max $\Delta T_i$, $\Delta T_i$ is reset to 0;

j stands for the $j^{th}$ I/O within the $i^{th}$ queue; and n stands for total number of I/Os within queue i/$i^{th}$ queue.

As noted above and in connection with FIGS. 4A and 4B, when the current TTE of the highest priority queue (the one having least TTE) expires (e.g., becomes zero), the current TTEs of all queues 102a-j are reinitialized to their respective TMAX values of EQUATION 1 and I/Os are generally shifted to next higher queue so that all I/Os finally reach the highest priority queue 102a and are executed and current RC's of queues are recalculated based on the IOs present in the queue.

It should be noted that EQUATIONS 2A and 4A are the same, and that EQUATION 4B in comparison to EQUATION 2B are the same with one different where EQUATION 4B includes an additional term, $\Sigma_{j=1}^{n} IO_{in\ i} EET_j$, to provide for adjusting the RC values of the queues based on I/Os placed in the queue.

Figure 6:
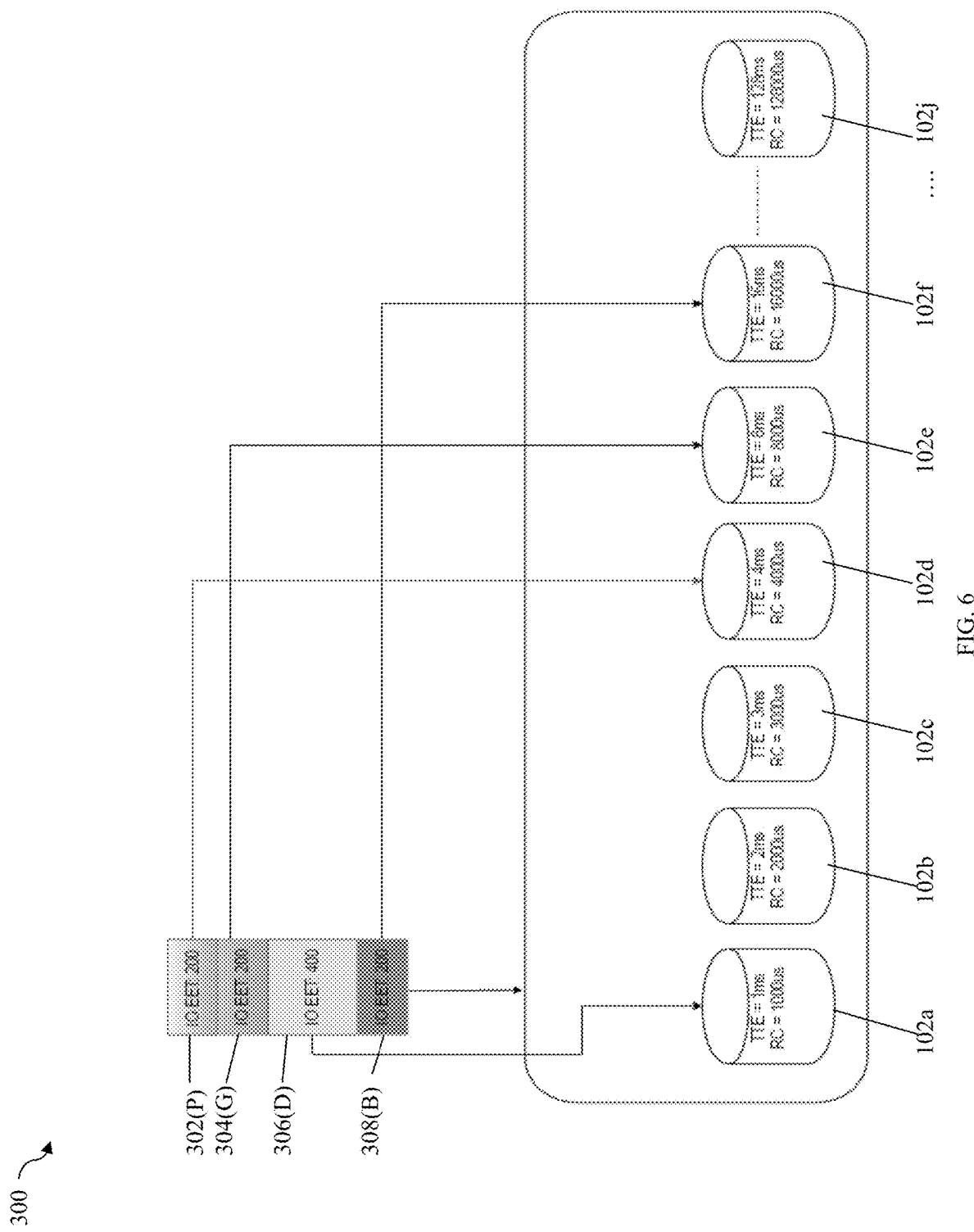

Continuing with the example above, after the third point in time, the queues 102a-j may have associated TTE and RC values as in FIG. 5 which is similar to that of FIG. 3A. Assume now while the system and queues 102a-j have an associated state as in FIG. 5, another 4 I/Os 302, 304, 306 and 308 are received. Also assume each of the I/Os has an associated SLO and EET as follows: I/O 302 SLO=PLATINUM (P)=4 ms RT goal with EET of 200 µs; I/O 304 SLO=GOLD (G)=8 ms RT goal with EET of 200 µs; I/O 306 SLO=DIAMOND (D)=1 ms RT goal with EET of 400 µs; and I/O 308 SLO=BRONZE (B)=16 ms RT goal with EET of 200 µs. Consistent with discussion above, processing selects the following queues as illustrated in the example 300 of FIG. 6 into which each of the foregoing 4 I/Os are placed in accordance with their respective SLOs—

I/O 302 SLO=PLATINUM (P)=4 ms RT goal with EET of 200 µs is placed in queue 102d;

I/O 304 SLO=GOLD (G)=8 ms RT goal with EET of 200 µs is placed in queue 102e;

I/O 306 SLO=DIAMOND (D)=1 ms RT goal with EET of 200 µs is placed in queue 102a; and I/O 308 SLO=BRONZE (B)=16 ms RT goal with 200 µs is placed in queue 102f.

Due to placement of the 4 I/Os in the queues as noted above and in FIG. 6, the RC values of the queues 102a, 102d, 102e and 102f are reduced based on the EETs of the I/Os placed in each of the queues.

Figure 7:
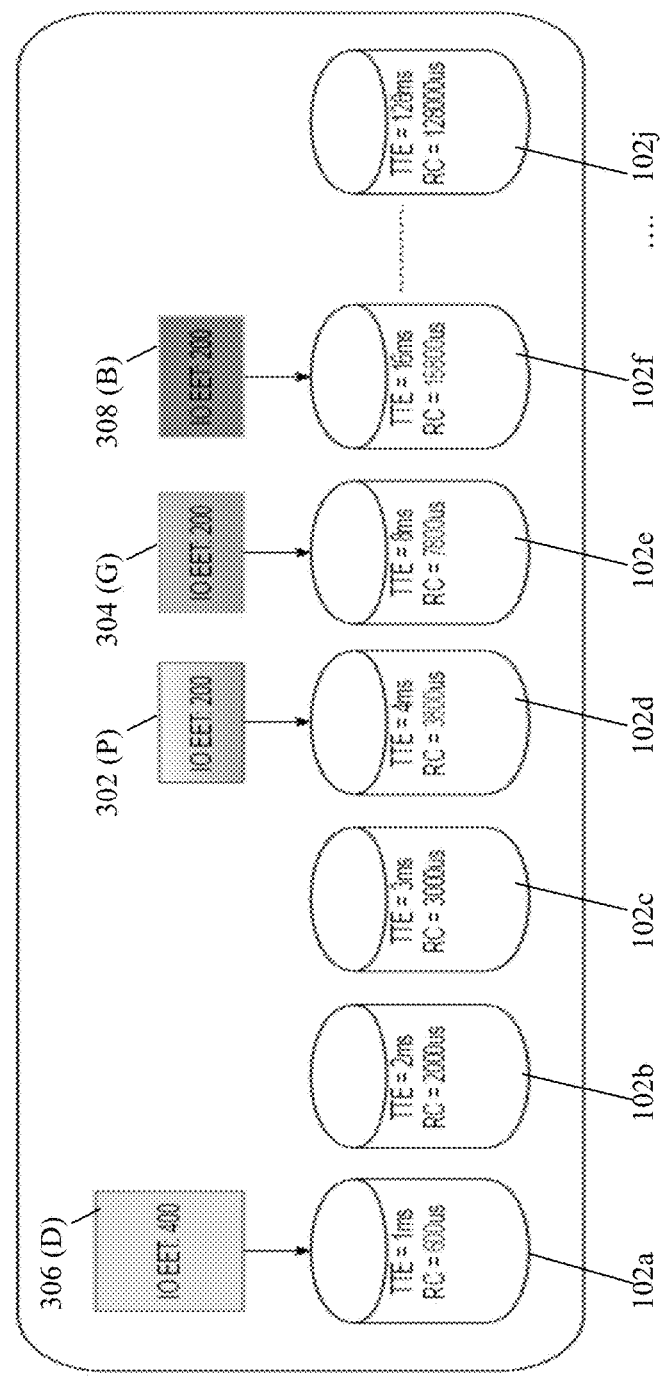

Referring to FIG. 7, shown is an example 400 illustrating placement of the I/Os 302, 304, 306 and 308 in the selected queues noted above and also illustrating the adjusted or reduced RC values of the queues 102a, 102d, 102e and 102f based on the EETs of the I/Os placed in the queues. In the example 400, I/O 306 having EET=400 µs is placed in queue 102a where the RC value is reduced from 1 ms to 600 µs; I//O 302 having EET=200 µs is placed in queue 102d where the RC value is reduced from 4 ms to 3800 µs; I//O 304 having EET=200 µs is placed in queue 102e where the RC value is reduced from 8 ms to 7800 µs; and I//O 308 having EET=200 µs is placed in queue 102f where the RC value is reduced from 16 ms to 15800 µs. FIG. 7 shows the reduction in RC values of inserted I/Os (e.g., based on EQUATIONS 4A and 4B).

In at least one embodiment, processing may be periodically performed such as at each 1 ms. time interval, to perform I/O shifting. To illustrate I/O shifting, reference is made to FIG. 8.

Figure 8:
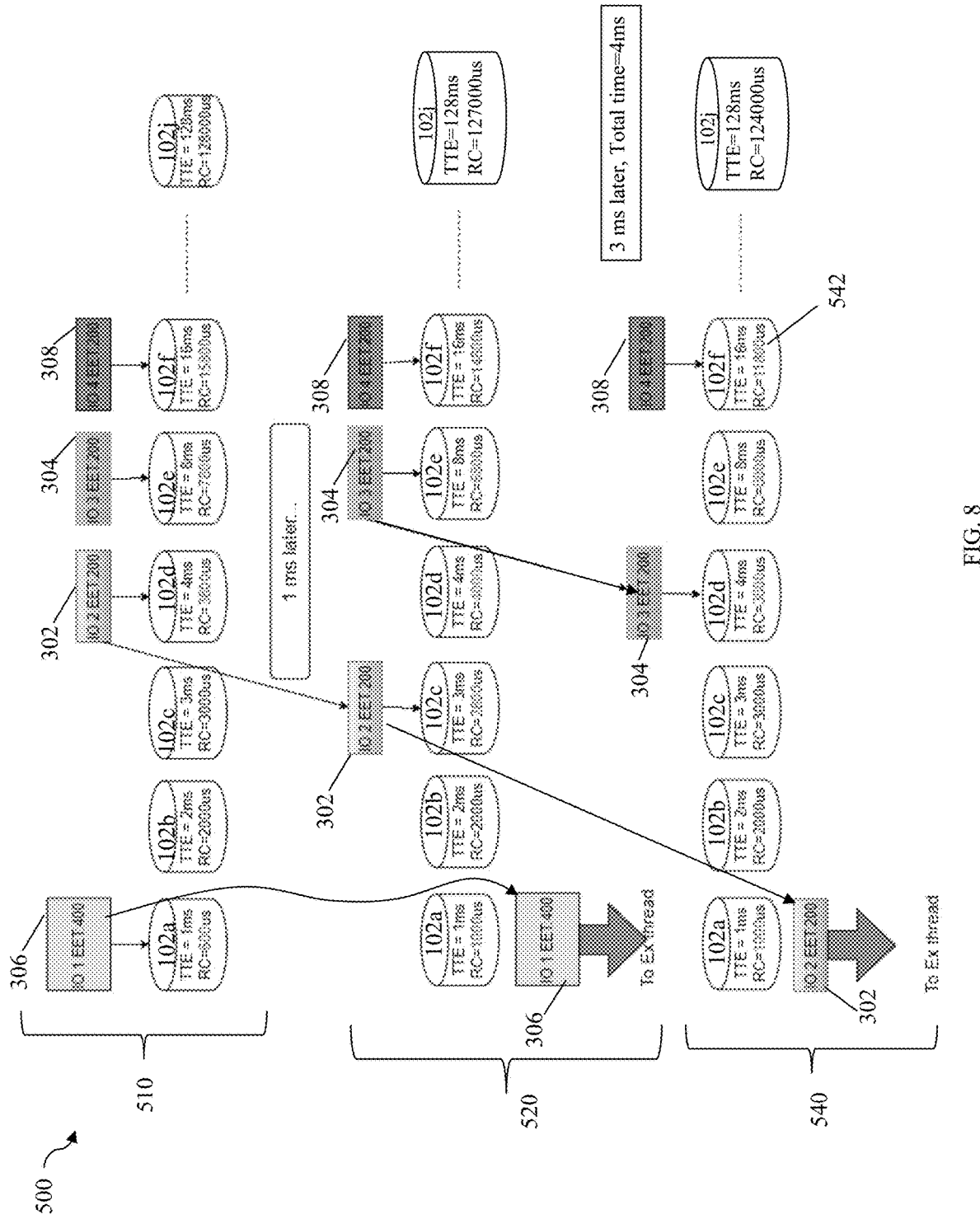

Element 510 of FIG. 8 may denote the state of the system as in the example 400 of FIG. 7. Element 520 illustrates the state of the queues 102a-j after an additional 1 ms. of time as compared to element 510. In 520 1 ms later, no additional I/Os are received but I/O shifting is performed. I/Os are shifted out of a queue and into a next higher level priority queue based on a timer or counter of elapsed time associated with each queue 102a-j. I/Os are shifted out of a queue i when an amount of time $\Delta T_i$=Max $\Delta T_i$ for that queue has elapsed. For example, with reference to the queues 102a-j, I/Os may be shifted out of queues 102a-d every 1 ms where I/O shifted from 102a are then executed (e.g., sent to the execution thread for execution), and I/Os shifted out of 102b-d are shifted into the next highest priority queue (e.g., I/O shifted from 102d to 102c; from 102c to 102b, and from 102b to 102a). I/Os from queue 102e are shifted at every 4 ms time interval to queue 102d. I/Os from queue 102f are shifted at every 8 ms time interval to queue 102e. I/Os are shifted every 16 ms time interval from 102g to 102f. I/Os from queues 102h, 102i 102j are shifted at every 32 ms time interval, respectively, to queues 102g, 102h, 102i.

In connection with EQUATIONS 2A, 2B, 4A and 4B, $\Delta T_i$ stands for time decay (e.g., elapsed time) of queue "i". A timer or counter "i" associated with each individual $i^{th}$ one of the queues 102a-j may track the current value of $\Delta T_i$ for queue "i", and when $\Delta T_i$ reaches Max $\Delta T_i$, $\Delta T_i$ for queue "i" is reset to 0 and I/Os may be shifted out of queue "i". Based on EQUATIONS 2A and 4A, following are values of Max $\Delta T_i$ for the queues 102a-j respectively having "i" values [1-10]: Max $\Delta T_i$=1 for queues 102a-d; Max $\Delta T_i$=4 ms for queue 102e; Max $\Delta T_i$=8 ms for queue 102f; Max $\Delta T_i$=16 ms for queue 102g; and Max $\Delta T_i$=32 ms for queues 102h and 102i and 102j. Once $\Delta T_i$=Max $\Delta T_i$ for queue i, then its associated $\Delta T_i$ is reset to 0 (whereby there is no reduction in RCi for that time period during which $\Delta T_i$ is 0.

In 520, I/O 306 is no longer pending and is shifted to the execution thread for execution; and I/O 302 is shifted from 102d to 102c and the RC of 102a is increased to 1000 µs. I/O shifting from 102d to 102c results in RC for 102c being decreased to 2800 µs (−200 µs due to I/O 302 shifted in) and the RC for 102d being increase to 4000 µs (+200 µs due to EET of IO shifted out). Although 102e and 102f have I/Os, the amount of time decay or elapsed time denoted by the counters/timers of each of the ith queues have not yet reached $\Delta T_i = \text{Max } \Delta T_i$. The RC values for 102e-j are reduced by 1 ms or 1000 µs such as illustrated in 520 where 102e has its RC value reduced from 7800 µs in 510 to 6800 µs in 520, where 102f has its RC value reduced from 15800 µs to 14800 µs, and 102j has its RC value reduced from 12800 µs to 127000 µs.

Element 540 shows the state of the queues 102a-j 3 ms later subsequent to the state of 520 after a total amount of time=4 ms has elapsed since 510. In connection with the example 500, additional I/O shifting occurs at each occurrence of a 1 ms time interval although FIG. 8 does not show each individual shift. For example, I/O 302 is shifted first from 102c to 102b (total time=2 ms), then from 102b to 102a (total time=3 ms) and then from 102b to 102a (total time=4 ms) where, denoted by 540, I/O 302 is then shifted from queue 102a to execution. I/O 304 is shifted from 102e to 102d since processing is now at a 4 ms time interval whereby RC value of 102d is then decreased from 4000 µs to 3800 µs (−200 µs due to I/O 304 shifted in) and the RC value of 102e is increased to 8000 µs. The RC value for 102f is decreased by 3 ms or 3000 ms (from 148000 µs to 118000 µs) due to the elapsed additional 3 ms from 520 to 540. Although not explicitly mentioned in connection with 540, the remaining queues also have their associated RC values adjusted as needed based on discussions and equations herein.

Figure 9:
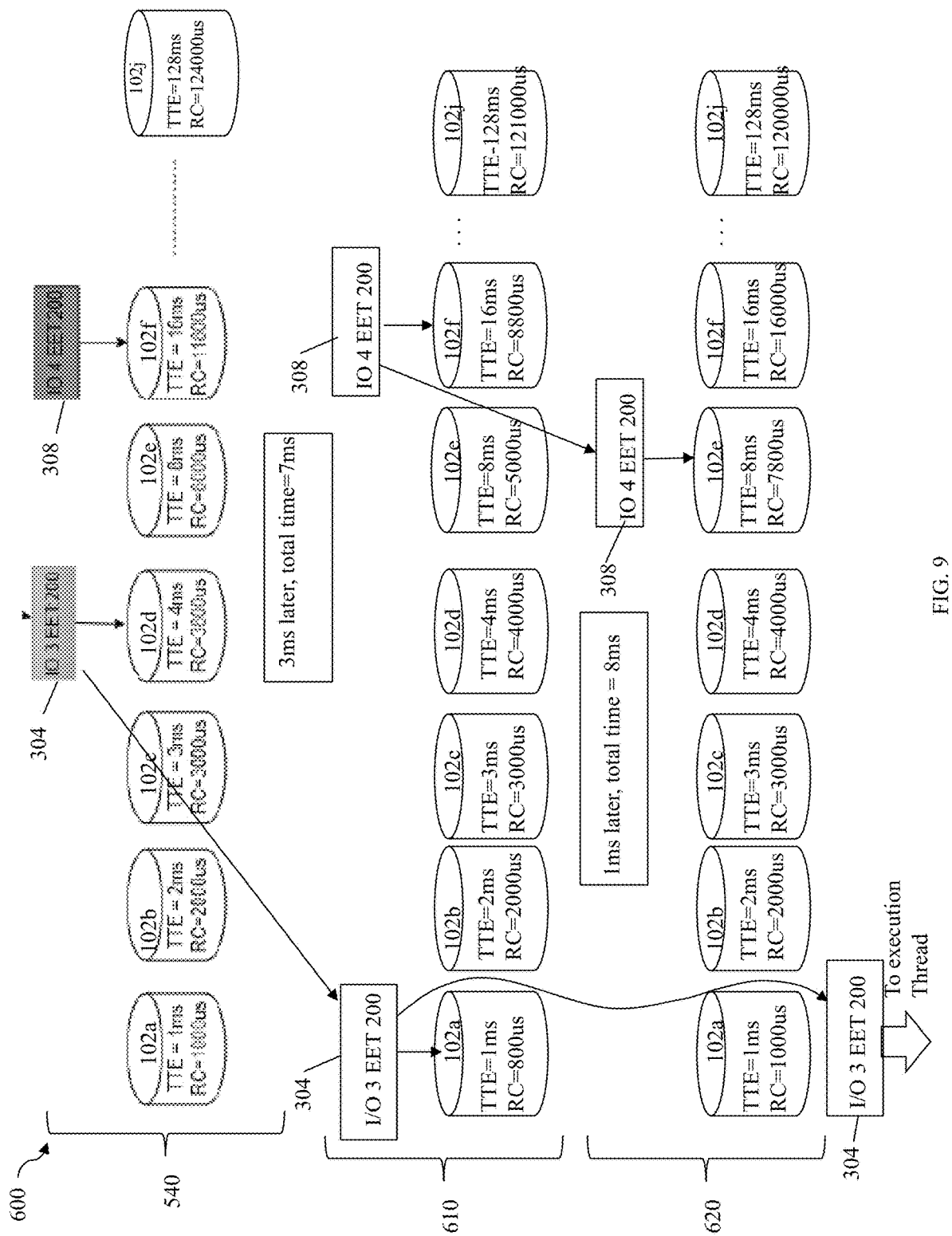

Continuing with the example and with reference to FIG. 9, an additional 3 ms for a total amount of time=7 ms. now elapses and the queues 102a-j have the state 610. At this point in time, I/O 304 has shifted from 102d to 102a. Also, the RC value for 102f has been decreased from 11800 µs to 8800 µs. Although not explicitly mentioned, the remaining queues also have their associated RC values adjusted as needed in 610 based on discussions and equations herein.

Continuing with the example and with reference to FIG. 9, an additional 1 ms for a total amount of time=8 ms. now elapses and the queues 102a-j have the state 620. In 620, I/O 304 shifts out of 102a to execution. Additionally, I/O 308 shifts from 102f to 102e since the total elapsed time has now reached 8 ms (and shifts are performed for I/Os from 102f to 102e at 8 ms intervals). Based on EQUATIONS 4A and 4B, the RC value for 102f is 16000 µs and the RC value for 102e is 7800 µs. (e.g., RC value for 102e is reinitialized or reset to 8 ms (total time is a multiple of 4 ms) and then has an additional −200 us due to I/O 308 shifted in. RC value for 102f is reset or reinitialized to 160000 ms (total time is a multiple of 8 ms) and there are no I/Os in the queue 102f). Although not explicitly mentioned, the remaining queues also have their associated RC values adjusted as needed in 620 based on discussions and equations herein.

Generally, when performing the shifting when the TTE of the highest queue reaches zero, shifting is performed on the queues in sequential order from the highest priority queue 102a to the lowest priority queue 102j. Shifting starts from the highest priority queue 102a where eligible I/Os are shifted to execution. Subsequently, shifting continues with 102b where I/Os are shifted from 102b to 102c; from 102d to 102c; from 102e to 102d, and so on, as may be performed based on the timer associated with each queue (e.g., amount of elapsed time and Max $\Delta T_i$).

What will now be described are more complex examples where the queues 102a-j include multiple I/Os and where not all I/Os in the queue may be shifted in a single shift due to limits or constraints including the time distance or difference between the source queue and the target queue; and the RC value of the target queue (into which I/Os are shifted) since such an RC value cannot go below zero. Generally, the amount of I/Os that are allowed to be shifted must have a total sum EET value of all such I/Os that does not exceed the time distance or difference between the source queue and the target queue. Additionally, after the shift, the target queue RC must not be less than 0. Generally, the concept of a cutoff index may be used to denote the point, position or entry in a queue from which I/Os are shifted to the next highest priority queue. For simplification of illustration, FIGS. 10 and 11 show the state at various points in time for only the first 5 queues of FIG. 3A and others discussed above.

Figure 9B:
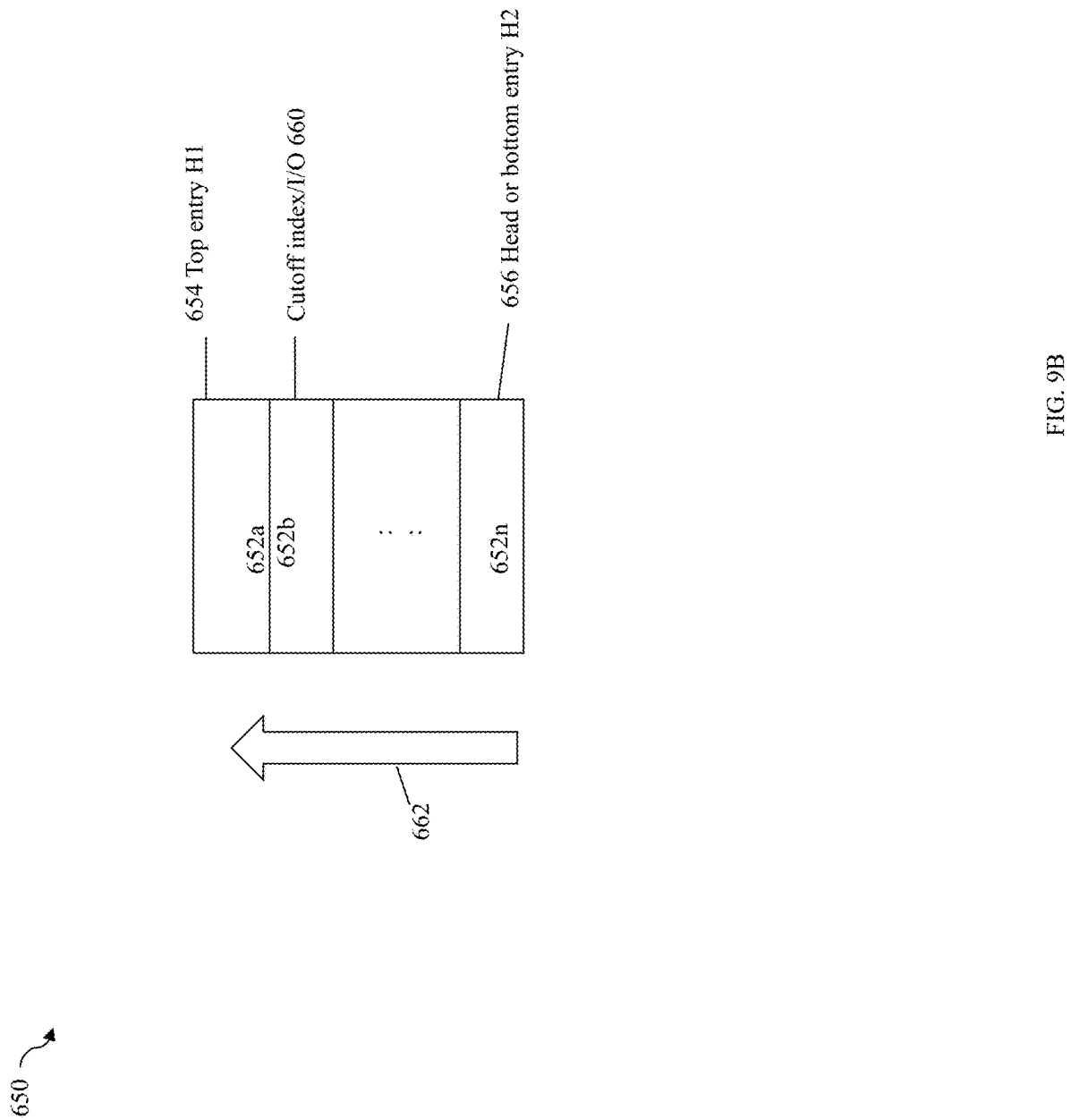

Referring to FIG. 9B, shown is an example 650 illustrating one of the I/O queues 102a-j in an embodiment in accordance with techniques herein. Each of 652a-n may denote a pending I/O included in the queue. With respect to the queue, 654 may denote the top entry of the queue and 656 may denote the head or bottom of the queue where new I/Os may be added to the top of the queue. Element 660 may denote the cutoff index (e.g., of the cutoff I/O) into the queue where I/Os from the cutoff index to the head or bottom of the queue 656 may be shifted at a point in time. Following examples utilize a cutoff index such as 660 denoting the point or entry in the queue from which I/Os included in the portion spanning 660 to 656 are shifted.

In at least one embodiment, when determining which I/Os and the number of I/Os shifted from a lower priority queue "i" (source queue) to a higher priority queue "i−1" (target queue), processing may start with head or bottom entry H2 652n of the lower priority queue and traverse the entries sequentially in the direction 662 from the head or bottom entry H2 toward 654, the top entry H1 to arrive at the cutoff index 660. During the traversal of the lower priority queue "i", a running EET total for all I/Os traversed is maintained as the total sum EET of all entries considered up to the current point/entry. The traversal stops when one of the following bounds or constrains is reached. Traversal of the queue stops when the total sum EET=the time interval or shift of the queue (e.g., time distance between TTE of current source queue "i" and target or destination queue "i−1"), or when the total sum EET equals or exceeds the RC value of the target queue "i−1". The cutoff index 660 is the entry or index into the source queue "i" where the total sum EET of all entries from 656 to 660 (inclusively) does not exceed the time interval or shift of the queue (e.g., time distance between TTE of current source queue "i" and target or destination queue "i−1") and also where the total sum EET of all entries from 656 to 660 (inclusively) does not exceed the RC value of the target queue "i−1". Thus, entries shifted are from 656 to 660 inclusively. With the next shifting triggered by the next occurrence of the time interval equal to the distance between the source and target queues, traversal starts with 652a which will be the new head or bottom entry H2 of the list. Any I/Os added to the queue "i" or shifted into this queue "i" from a lower priority queue "i+1" are added in at the top entry H1 position 654.

Figure 10:
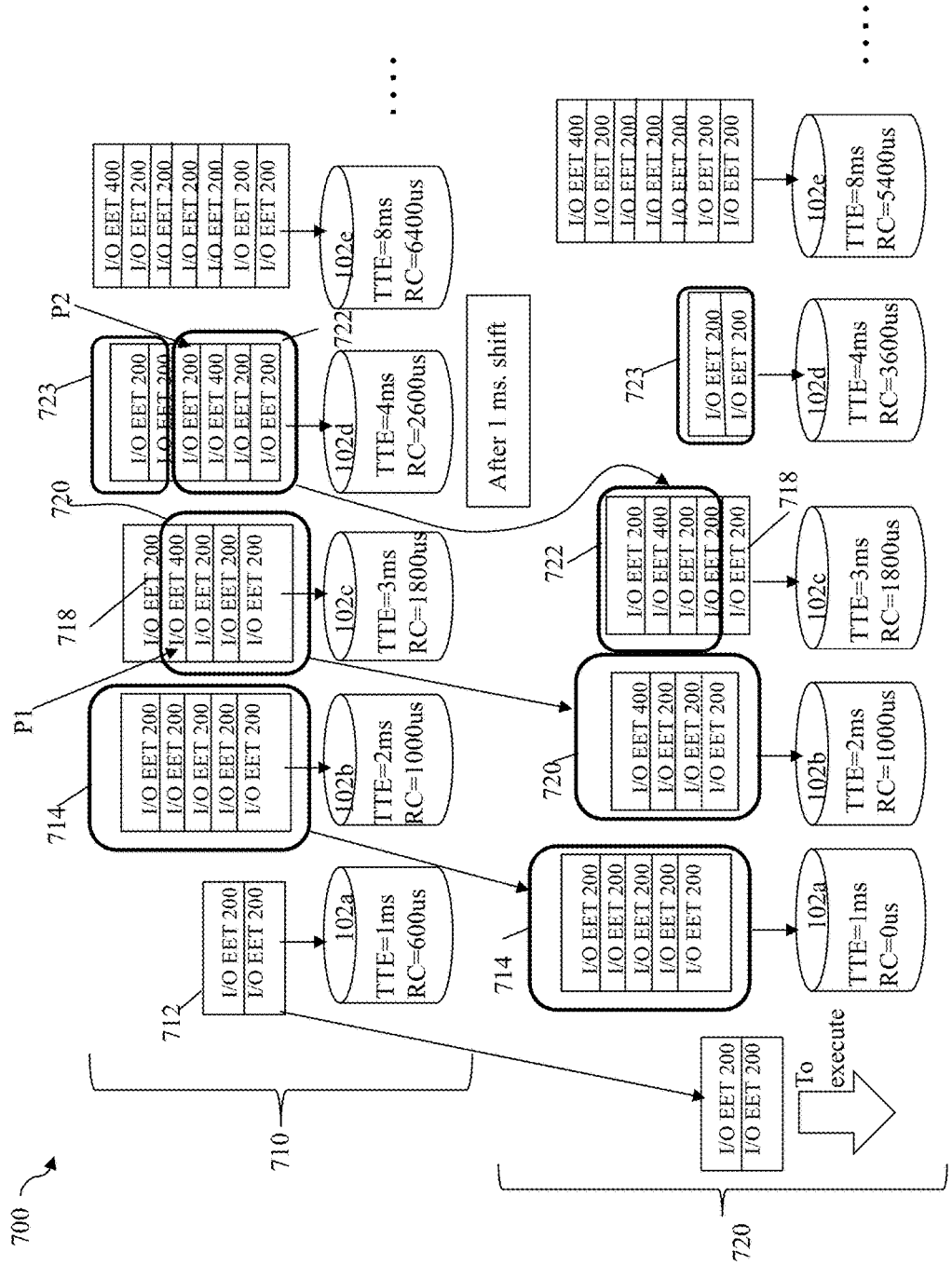
Figure 11:
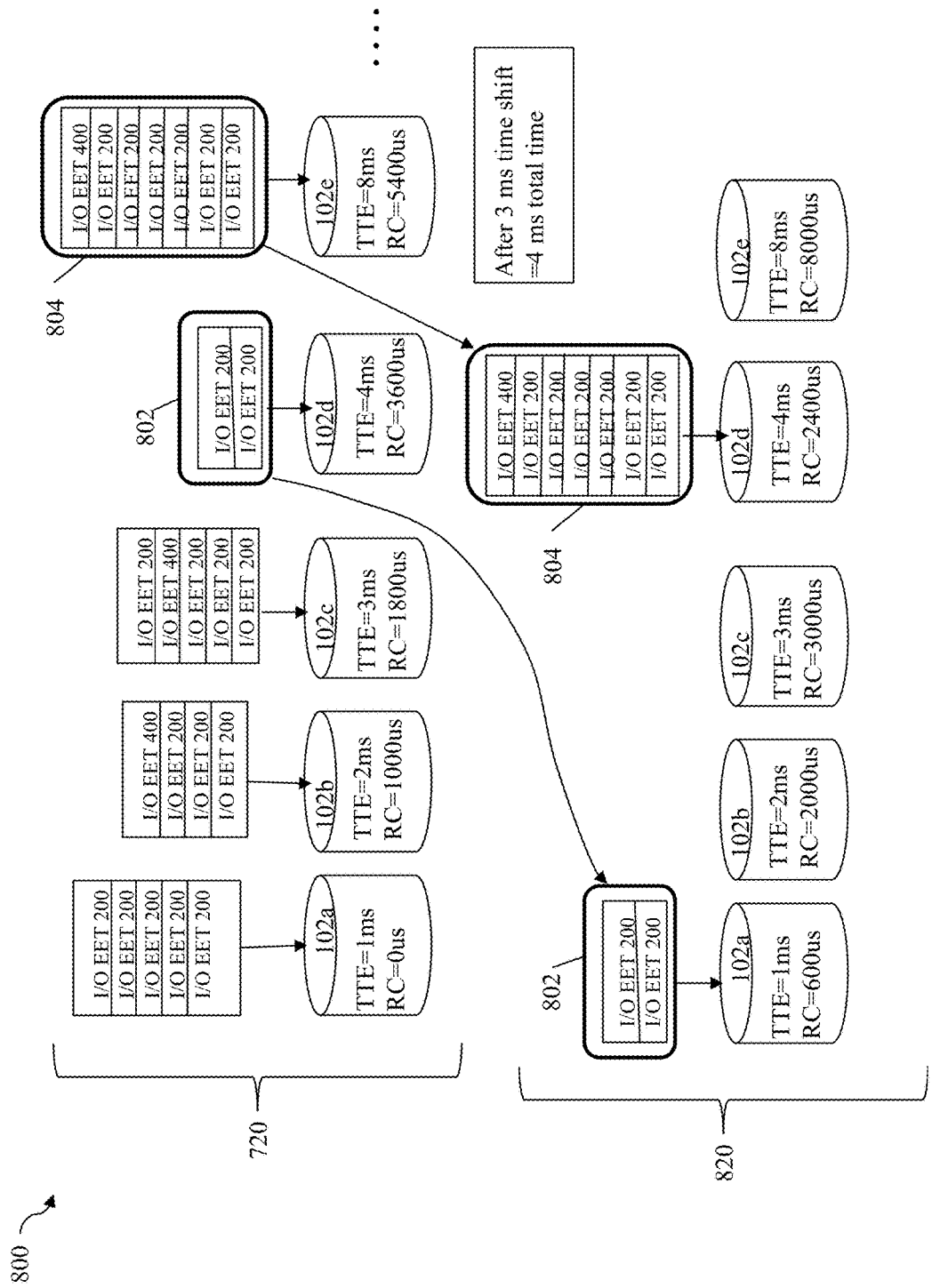

Referring to FIG. 10, shown is an example 700 illustrating the state of queues 102a-e at a first point in time 710 and at a second point in time 720 1 ms later. Element 710 indicates that queue 102a has 2 I/Os 712 having a total EET of 400 μs; queue 102b has 5 I/Os 714 having total EET of 1000 μs; queue 102c including I/Os 720 having a total EET of 1000 μs and I/O 718 having an EET of 200 μs; queue 102d including I/Os 722 having a total EET of 1000 μs and I/Os 723 having a total EET of 400 μs; and queue 102e including I/Os having a total EET of 1600 μs.

The queues 102a-e and others of 710 may be determined based on equations and discussions herein (e.g., EQUATIONS 4A and 4B).

Element 720 illustrates the state of queues 102a-e after a 1 ms time shift from that of 710. Consistent with discussion herein, processing may be performed to shift eligible I/Os from queues 102a-d. However, no I/Os are yet shifted from 102e due to timers associated with 102d and 102e not yet resetting or triggering such I/O shifts. After 1 ms has elapsed as denoted by 720, I/Os 712 are shifted from 102a to be executed. The maximum I/Os that can be shifted from 102a is based on the total EET values of such I/Os where the total amount cannot exceed 1 ms. Thus, I/Os 712=400 μs EET are shifted from 102a to an execution thread for execution of the I/Os. If there were additional I/Os in 102a of 710, one or more of these I/Os may be shifted from 102a to execution provided that such I/Os do not exceed the additional allowable 600 μs.

Generally, the maximum I/Os that can be shifted from 102a-102d in this example is based on the total EET values of such I/Os where the total amount cannot exceed 1 ms., the time interval or time distance between the source queue and the target queue. In connection with queue 102b of 710, I/Os 714 having a total EET=1 ms are shifted to queue 102a. In connection with queue 102c of 710, all I/Os 718 and 720 cannot be shifted due to their total EET being 1200 μs (e.g., >1 ms). In this case, a portion 720 of the I/Os may be shifted having a total EET=1000 μs (e.g., 1 ms.). P1 may denote the cutoff index (e.g., of the cutoff I/O) into the queue 102c where I/Os from the cutoff index to the head or bottom of the queue are shifted. (e.g., I/Os 720 are shifted from queue 102c to queue 102b). In connection with queue 102d of 710, all I/Os 722 and 723 cannot be shifted due to their total EET being 1400 μs (e.g., >1 ms). In this case, a portion 740 of the I/Os may be shifted having a total EET=1000 μs (e.g., 1 ms.). P2 may denote the cutoff index (e.g., of the cutoff I/O) into the queue 102d where I/Os from the cutoff index to the head or bottom of the queue are shifted (e.g., I/Os 722 are shifted from queue 102b to queue 102a). Element 720 illustrates the state of the queues 102a-e after the shifting performed at 1 ms. of time has elapsed.

As denoted by 720, the RC of the target queue into which I/Os are shifted is decremented by the EET values of the I/Os shifted into the queue. Consistent with other discussion herein, the RC of a queue is generally decreased by the total sum EET of all I/Os placed in the queue (e.g., EQUATION 4B). Additionally, the RC of a queue may be decreased by the queue's corresponding $\Delta T_i$ (e.g., EQUATION 4B).

Continuing with the example from FIG. 10, reference is made to the example 800 of FIG. 11. Element 820 shows the state of the queues 102a-e after an additional 3 ms of time elapses for a total elapsed time of 4 ms. At this point in time, all I/Os from 102a-c of 720 have been shifted out for execution in connection with total elapsed times=2 ms and 3 ms. After a total elapsed time of 4 ms, relative to 710, as illustrated in 820 the I/Os 802 from queue 102d have been shifted down into queue 102a. Additionally in 820, I/Os 804 are shifted from queue 102e to queue 102d. It should be noted that the I/Os shifted 804 are bound by (e.g, cannot exceed) 4 ms denoting the time distance between the target queue 102d and the source queue 102e. As discussed herein, shifting from the source queue 102e to the target queue 102d is performed based on the timer associated with 102e which triggers such I/O shifting every 4 ms time interval (e.g., time distance between 102d and 102e).

For a series of queues that have contiguous and sequential "i" values with a time distance or granularity of time separation of 1 ms (e.g., queues 102a-d) the following EQUATION 5 may be used to calculate the cutoff index:

$$\text{cutoff } index_i = \begin{cases} n, & \sum_{j=1}^{n} IO_{in\ i} EET_j \leq 1\text{ms} \\ a, & \sum_{j=1}^{a} IO_{in\ i} EET_j \leq 1\text{ms} < \sum_{j=1}^{a+1} IO_{in\ i} EET_j, \quad a < n \end{cases}, \quad i \in \{1, 2, 3, 4\}$$

EQUATION 5

Where
"i" denotes the $i^{th}$ queue (e.g., as in FIG. 10);
"n" denotes the total I/O count for $i^{th}$ queue;
"a" denotes the maximum cutoff index within the $i^{th}$ queue; and
$IO_{in\ i}$ denotes the I/Os in the $i^{th}$ queue.

If a series of queues having sequential indices are discontiguous with more than 1 ms granularity or distance between any two queues having sequential indices (e.g., queues 102e-j), EQUATION 7 below may be used to express and calculate the cutoff index of such queues.

When shifting I/Os from current queue "i" (source queue) to previous queue "i−1" (destination or target queue), the RC value of queue "i−1" may be calculated as represented in EQUATION 6 below while EQUATION 7 is applied to calculate the cutoff index. Subsequently, the RC of the current queue "i" (source queue") is merged with the cutoff I/O credits from the next queue "i+1" (e.g. EET values of I/Os from lower priority queue "i+1" shifted into queue "i") in EQUATION 8.

$$RC_{i-1} = TTE_{i-1} - \sum_{j=1}^{n} IO_{in\ i-1} EET_j$$

EQUATION 6

-continued $$\text{cutoff index}_i = \begin{cases} n, & \sum_{j=1}^{n} IO_{in\ i}EET_j \le RC_{i-1} \\ a, & \sum_{j=1}^{a} IO_{in\ i}EET_j \le RC_{i-1} < \sum_{j=1}^{a+1} IO_{in\ i}EET_j,\ a < n \end{cases}, i > 4$$

EQUATION 7

$$RC_i = \sum_{j=1}^{n} IO_{in\ i}EET - \sum_{j=1}^{\text{cutoff index}_i} IO\text{ credit} + \sum_{j=\text{cutoff index}_{i+1}}^{n} IO\text{ credit}$$

EQUATION 8

Where

"i" denotes the $i^{th}$ queue (e.g., as in FIG. 10);

"n" denotes the total I/O count for $i^{th}$ queue;

"a" denotes the maximum cutoff index within the $i^{th}$ queue; and $IO_{in\ i}$ denotes the I/Os in the $i^{th}$ queue.

EQUATIONS 6 and 8 are both applicable in connection with all I/O queues 102a-j. As noted above, EQUATION 5 may be used to express the cutoff index calculation for I/O queues 102a-d and EQUATION 7 may be used to express the cutoff index calculation for remaining I/O queues 102e-j.

In connection with EQUATION 8 for queue "i", $RC_i$ (denoting the RC value of queue "i" after I/O shifting for a time interval) may be calculated by first summing the EET values of all I/Os currently in the queue "i" prior to the shifting (as denoted by the first term $\Sigma_{j=1}^{n} IO_{in\ i}EET$ of EQUATION 8); secondly subtracting the EETs of I/Os that are shifted out of queue "i" to higher priority queue "i-1" (as denoted by the second term $\Sigma_{j=1}^{\text{cutoff index}_i} IO$ credit of EQUATION 8; and then thirdly adding the EETs of I/Os that are shifted into queue "i" from lower priority queue "i+1" as denoted by the third term $\Sigma_{j=\text{cutoff index}_{i+1}}^{n} IO$ credit of EQUATION 8).

What will now be described are flowcharts summarizing processing as described above.

Figure 12:
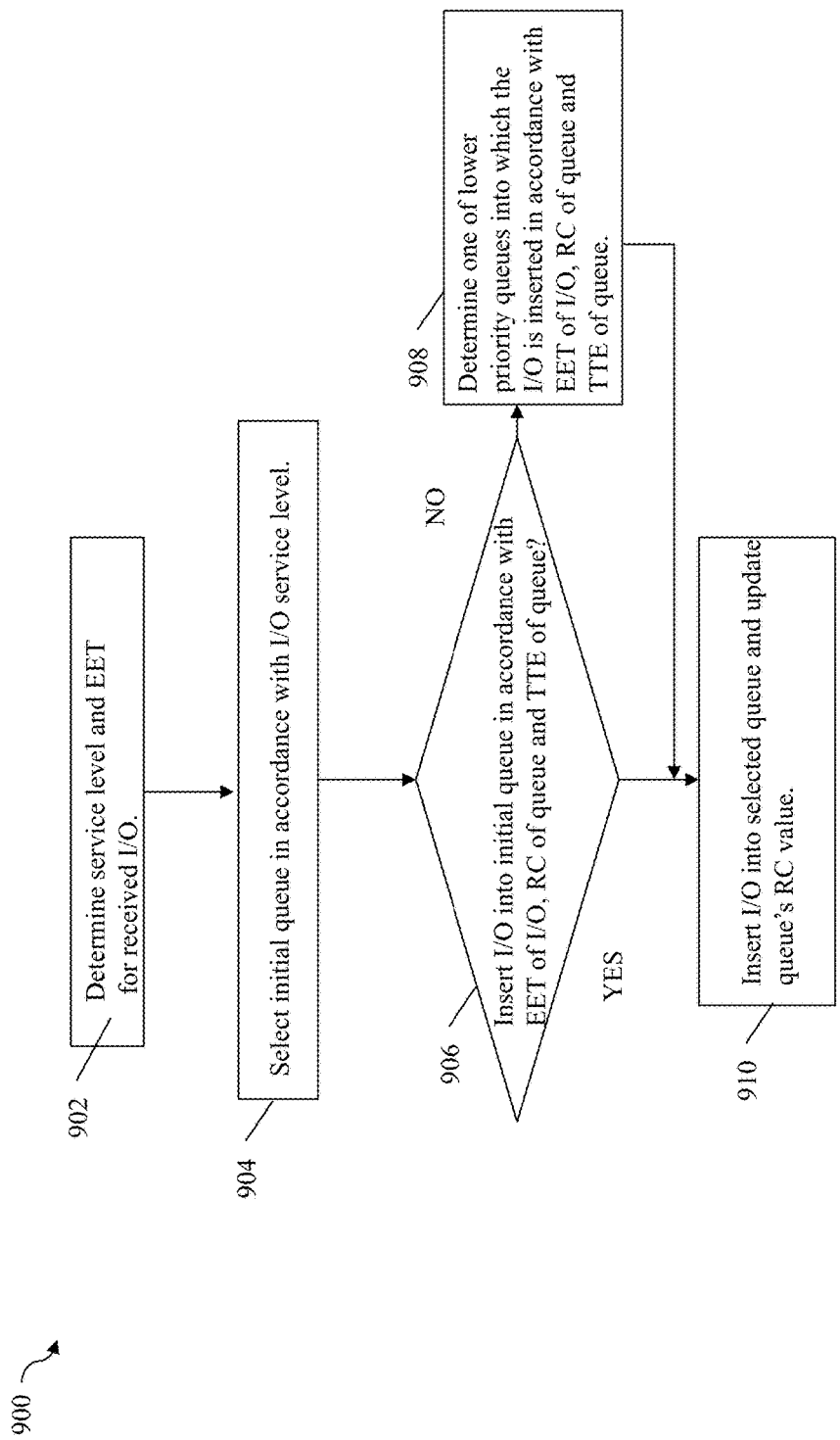
FIGS. 12, 13 and 14 are flowcharts of processing steps that may be performed in an embodiment in accordance with techniques herein.

Referring to FIG. 12, shown is a first flowchart 900 of processing steps that may be performed in an embodiment in accordance with techniques herein. Flowchart 900 may be performed with respect to a received I/O to insert the I/O as a pending I/O into one of the queues 102a-j. At step 902, an I/O is received and the I/O service level and EET for the I/O is determined. As discussed above, the I/O's service level may be based on SLO, priority and/or other attributes of the I/O. EET for the I/O may be based, for example, on I/O attributes or characteristics and historical performance data regarding observed or measured execution time of such I/Os. From step 902, control proceeds to step 904. In step 904, an initial one of the queues 102a-j may be selected in accordance with the I/O service level of the received I/O. From step 904, control proceeds to step 906. At step 906, a determination is made as to whether the I/O can be inserted into the selected initial queue from step 904 in accordance with the EET of the I/O, RC of the initial selected queue, and TTE of the initial selected queue. Step 906 determination may include, for example, determining whether the initial queue has an RC value and TTE value which are greater than or equal to the EET of the I/O. If step 906 evaluates to no, control proceeds to step 908. At step 908, processing determines one of the lower priority queues (lower priority than the initially selected queue in step 904) into which the I/O can be inserted in accordance with the EET of the I/O, RC of the lower priority queue, and TTE of the lower priority queue. As described above, step 908 may include traversing the remaining queues having priority lower than the initial queue in decreasing queue priority order and selecting the highest priority queue of the remaining queues where the selected queue has an RC value and TTE value which are greater than or equal to the EET of the I/O. From step 908 control proceeds to step 910. If step 906 evaluates to yes, control proceeds to step 910. At step 910 the I/O is inserted into the selected queue and the queues RC value is accordingly updated (e.g., decreased by the inserted I/Os EET).

Figure 13:
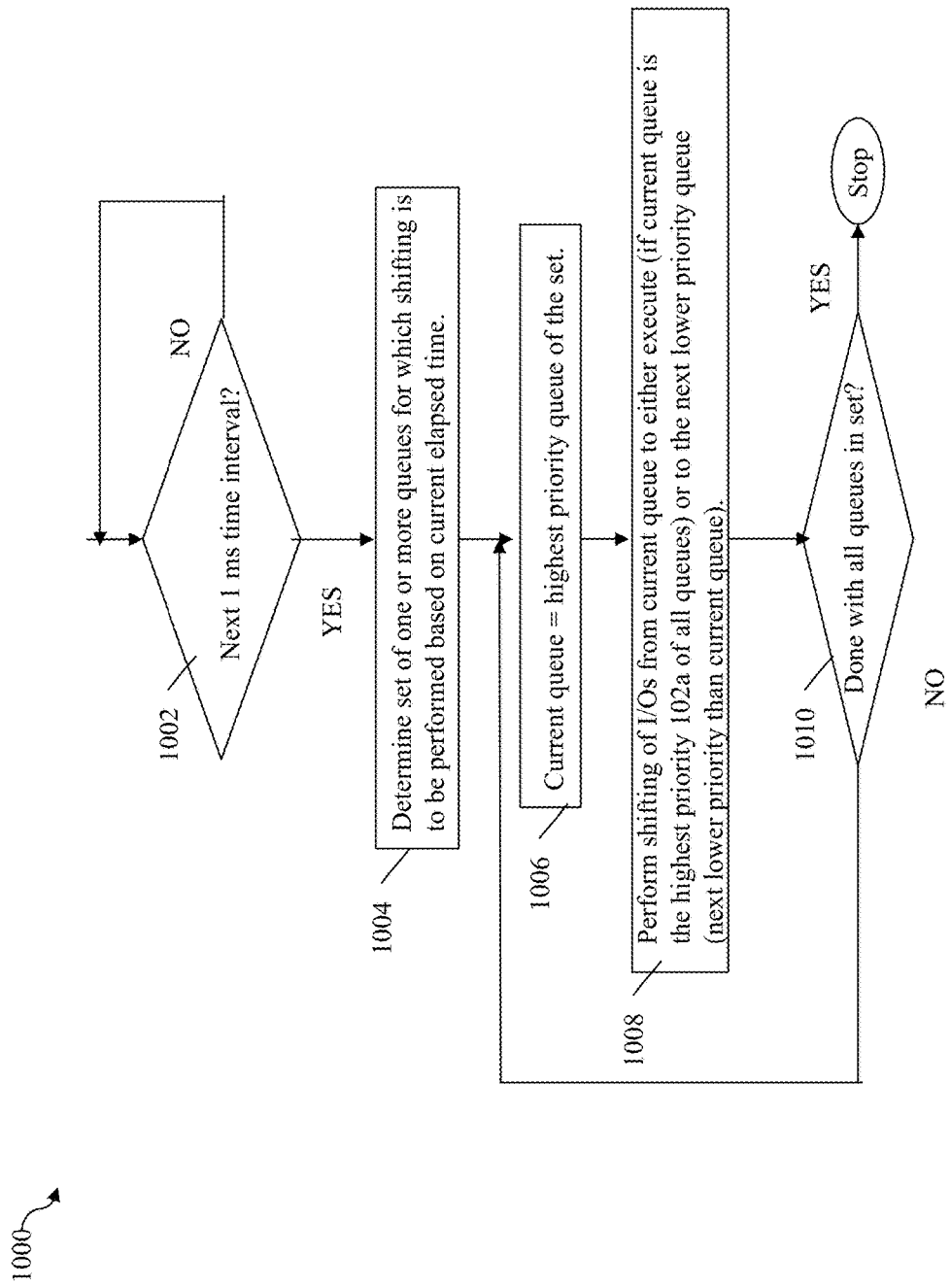

Referring to FIG. 13, shown is a second flowchart 1000 of processing steps that may be performed in an embodiment in accordance with techniques herein. Flowchart 1000 may be performed with each occurrence of a 1 ms. time interval, or more generally, the TTEmax of the highest priority queue 102a. At step 1002, a determination is made as to whether the current time has elapsed another 1 ms. time interval. Processing remains at step 1002 until step 1002 evaluates to yes. From step 1002, control proceeds to step 1004. At step 1004, a set of one or more of the system queues 102a-j is determined for which shifting is to be performed based on the current elapsed time. A queue "h" (one of the queues 102a-j) is included in the set if the time distance between the TTE (or TTEmax) of source queue "h" and target or destination queue "h-1" is a multiple of the current elapsed time. For example, the queues 102a-d are in the set at each occurrence of the 1 ms time interval. The queue 102e is in the set if the current elapsed time is a multiple of 4 ms. The queue 102f is in the set if the current elapsed time is a multiple of 8. The queue 102g is in the set if the current elapsed time is a multiple of 16. The queues 102h, 102i, 102j are in the set if the current elapsed time is a multiple of 32. Control proceeds to step 1006 where current queue is assigned the highest priority queue of the set. From step 1006, control proceeds to step 1008. At step 1008 I/O shifting is performed where I/Os from the current queue are shifted to either execute (if current queue is the highest priority queue 102a of all system queues), or otherwise shifted to the next lowest priority queue of the system (e.g., next lower priority than current queue). For example, if current queue is 102h, shifting is performed to shift I/Os from 102h to 102g. From step 1008, control proceeds to step 1010. At step 1010, a determination is made as to whether processing is complete for all queues in the set. If step 1010 evaluates to yes, processing stops. If step 1010 evaluates to no, control proceeds to step 1006 to perform shifting of I/O from the next highest priority queue in the set.

Figure 14:
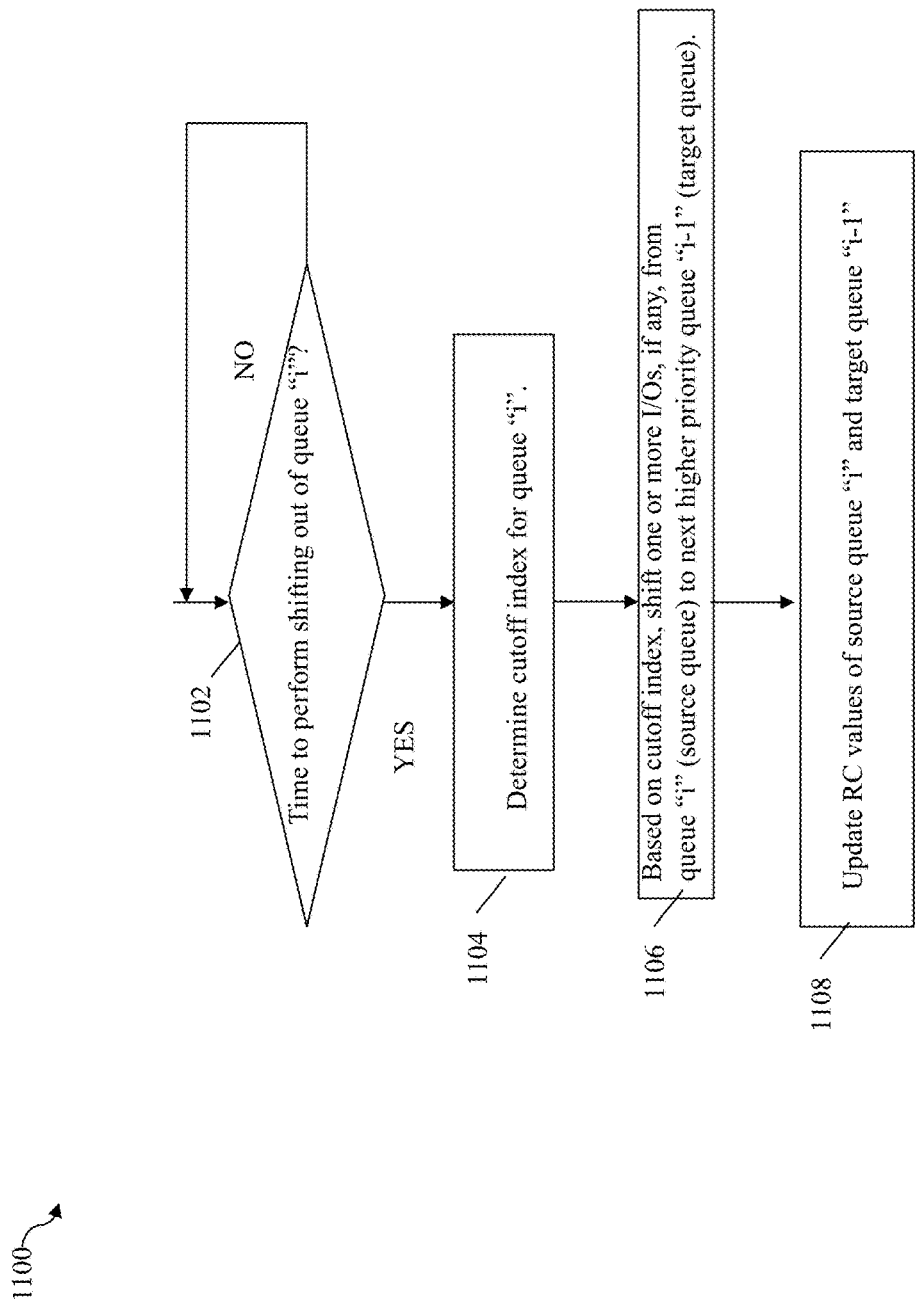

Referring to FIG. 14, shown is a second flowchart 1100 of processing steps that may be performed in an embodiment in accordance with techniques herein. Flowchart 1100 may be performed for each queue 102a-j as may be triggered for each source queue in accordance with processing of step 1008 of FIG. 13. At step 1102, a determination is made as to whether it is time to perform shifting of I/Os out of queue "i", which is one of the queues 102a-j. Control remains at step 1102 until 1102 evaluates to yes. Once step 1102 evaluates to yes, control proceeds to step 1104. At step 1104, processing is performed to determine a cutoff index for queue "i". From step 1104, control proceeds to step 1106. At step 1106, based on the cutoff index determined in step 1104, one or more I/Os (if any) are shifted from queue "i" (source queue) to the next higher priority queue "i–1" (target queue). From step 1106, control proceeds to 1108 where the RC values of the source queue "i" and target queue "i–1" are updated based on the I/O shifted in step 1106.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing input/output (I/O) operations comprising:
receiving, using a processor, an I/O operation having an associated expected execution time (EET) and an I/O service level;
selecting, using a processor and in accordance with the EET and the service level of the I/O operation, a first queue of a plurality of pending I/O operation queues, wherein the plurality of pending I/O operation queues has a ranking from a highest priority queue of the plurality of pending I/O operation queues to a lowest priority queue of the plurality of pending I/O operation queues;
responsive to said selecting, inserting, using a processor, the I/O operation into the first queue; and
performing, using a processor, I/O operation shifting for at least one of the plurality of pending I/O operation queues, wherein said I/O operation shifting for the at least one pending I/O operation queue includes shifting one or more I/O operations from the at least one pending I/O operation queue to another one of the plurality of pending I/O operation queues that is ranked immediately higher than the at least one pending I/O operation queue, wherein each queue of the plurality of pending I/O operation queues is associated with a different maximum time to expiry (max TTE) denoting a maximum wait time before which I/O operations of said each queue are scheduled for execution or servicing, and wherein said I/O operation shifting includes performing I/O operation shifting for a particular queue of the at least one pending I/O operation queues responsive to a timer associated with said particular queue reaching a specified maximum value associated with said particular queue, wherein the timer indicates an amount of elapsed time, and wherein the specified maximum value of the timer for the particular queue is a mathematical difference between a max TTE for the particular queue and another max TTE of another particular queue of the plurality of pending I/O operation queues, wherein the another particular queue is ranked in said ranking immediately higher than the particular queue in said ranking.

2. The method of claim 1, wherein the I/O operation performs a data access operation with respect to data of a target logical device having a service level objective, and wherein the I/O service level is determined as the service level objective of the target logical device.

3. The method of claim 2, wherein each queue of the plurality of pending I/O operation queues has an amount of remaining credits (RC) of said each queue available for consumption, and wherein each queue of the plurality of pending I/O operation queues has a current TTE (time to expiry) that decreases over time based on elapsed time, and wherein responsive to the highest priority queue having an associated current TTE that reaches zero, each of a plurality of current TTEs corresponding to a different one of the plurality of pending I/O operation queues is initialized to a particular max TTE associated with the different one of the plurality of pending I/O operation queues.

4. The method of claim 3, wherein said selecting includes:
selecting an initial queue of the plurality of pending I/O operation queues in accordance with the service level objective and the max TTE associated with the initial queue;
determining whether the initial queue has an associated RC that is greater than or equal to the EET of the I/O operation and an associated current TTE that is greater than or equal to the EET of the I/O operation; and
if it is determined the initial queue does have an associated RC that is greater than or equal to the EET of the I/O operation and an associated current TTE that is greater than or equal to the EET of the I/O operation, determining the initial queue as the first queue wherein said inserting inserts the I/O operation into the initial queue and decreasing the associated RC of the initial queue in accordance with the EET of the I/O operation.

5. The method of claim 4, further comprising:
if it is determined the initial queue does not have an associated RC that is greater than or equal to the EET of the I/O operation and an associated current TTE that is greater than or equal to the EET of the I/O operation, traversing remaining queues of the plurality of pending I/O operation queues in accordance with the ranking of the plurality of pending I/O operation queues to determine the first queue having an associated RC that is greater than or equal to the EET of the I/O operation and an associated current TTE that is greater than or equal to the EET of the I/O operation; and
decreasing the RC of the first queue in accordance with the EET of the I/O operation inserted into the first queue.

6. The method of claim 5, wherein said performing I/O operation shifting, includes;
shifting one or more I/O operations from the highest priority queue of the plurality of pending I/O operation queues to one or more threads that execute the one or more I/O operations from the highest priority queue; and
for each of the one or more I/O operations shifted out of the highest priority queue, decreasing the RC of the highest priority queue in accordance with one or more EETs respectively associated with the one or more I/O operations shifted out of the highest priority queue.

7. The method of claim 6, wherein a sum of the one or more EETs associated with the one or more I/O operations shifted out of the highest priority queue does not exceed a maximum the max TTE value of the highest priority queue.

8. The method of claim 6, wherein a second queue of the plurality of pending I/O operation queues is ranked immediately lower than the highest priority queue in accordance with the ranking.

9. The method of claim 8, wherein said performing I/O operation shifting includes:
shifting one or more I/O operations from the second queue to the highest priority queue; and
for each I/O operation of the one or more I/O operations shifted out of the second queue and into the highest priority queue, decreasing the RC of the second queue in accordance with one or more EETs respectively associated with the one or more I/O operations shifted out of the second queue and increasing the RC of the highest priority queue in accordance with the one or more EETs respectively associated with the one or more I/O operations shifted out of the second queue.

10. The method of claim 9, wherein a distance denotes a time difference between a first max TTE of the second queue and a second max TTE of the highest priority queue.

11. The method of claim 10, wherein a sum of the one or more EETs associated with the one or more I/O operations shifted out of the second queue does not exceed the distance.

12. The method of claim 10, wherein a sum of the one or more EETs associated with the one or more I/O operations shifted out of the second queue does not exceed the RC of the highest priority queue.

13. A system comprising:
at least one processor; and
a memory comprising code stored thereon that, when executed, performs a method of processing input/output (I/O) operations, comprising:
receiving an I/O operation having an associated expected execution time (EET) and an I/O service level;
selecting, in accordance with the EET and the service level of the I/O operation, a first queue of a plurality of pending I/O operation queues, wherein the plurality of pending I/O operation queues has a ranking from a highest priority queue of the plurality of pending I/O operation queues to a lowest priority queue of the plurality of pending I/O operation queues;
responsive to said selecting, inserting the I/O operation into the first queue; and
performing I/O operation shifting for at least one of the plurality of pending I/O operation queues, wherein said I/O operation shifting for the at least one pending I/O operation queue includes shifting one or more I/O operations from the at least one pending I/O operation queue to another one of the plurality of pending I/O operation queues that is ranked immediately higher than the at least one pending I/O operation queue, wherein each queue of the plurality of pending I/O operation queues is associated with a different maximum time to expiry (max TTE) denoting a maximum wait time before which I/O operations of said each queue are scheduled for execution or servicing, and wherein said I/O operation shifting includes performing I/O operation shifting for a particular queue of the at least one pending I/O operation queues responsive to a timer associated with said particular queue reaching a specified maximum value associated with said particular queue, wherein the timer indicates an amount of elapsed time, and wherein the specified maximum value of the timer for the particular queue is a mathematical difference between a max TTE for the particular queue and another max TTE of another particular queue of the plurality of pending I/O operation queues, wherein the another particular queue is ranked in said ranking immediately higher than the particular queue in said ranking.

14. A non-transitory computer readable medium comprising code stored thereon that, when executed, performs a method of processing input/output (I/O) operations comprising:
receiving an I/O operation having an associated expected execution time (EET) and an I/O service level;
selecting, in accordance with the EET and the service level of the I/O operation, a first queue of a plurality of pending I/O operation queues, wherein the plurality of pending I/O operation queues has a ranking from a highest priority queue of the plurality of pending I/O operation queues to a lowest priority queue of the plurality of pending I/O operation queues;
responsive to said selecting, inserting the I/O operation into the first queue; and
performing I/O operation shifting for at least one of the plurality of pending I/O operation queues, wherein said I/O operation shifting for the at least one pending I/O operation queue includes shifting one or more I/O operations from the at least one pending I/O operation queue to another one of the plurality of pending I/O operation queues that is ranked immediately higher than the at least one pending I/O operation queue, wherein each queue of the plurality of pending I/O operation queues is associated with a different maximum time to expiry (max TTE) denoting a maximum wait time before which I/O operations of said each queue are scheduled for execution or servicing, and wherein said I/O operation shifting includes performing I/O operation shifting for a particular queue of the at least one pending I/O operation queues responsive to a timer associated with said particular queue reaching a specified maximum value associated with said particular queue, wherein the timer indicates an amount of elapsed time, and wherein the specified maximum value of the timer for the particular queue is a mathematical difference between a max TTE for the particular queue and another max TTE of another particular queue of the plurality of pending I/O operation queues, wherein the another particular queue is ranked in said ranking immediately higher than the particular queue in said ranking.

15. The non-transitory computer readable medium of claim 14, wherein the I/O operation performs a data access operation with respect to data of a target logical device having a service level objective, and wherein the I/O service level is determined as the service level objective of the target logical device.

16. The non-transitory computer readable medium of claim 15, wherein each queue of the plurality of pending I/O operation queues has an amount of remaining credits (RC) of said each queue available for consumption, and wherein each queue of the plurality of pending I/O operation queues has a current TTE (time to expiry) that decreases over time based on elapsed time, and wherein responsive to the highest priority queue having an associated current TTE that reaches zero, each of a plurality of current TTEs corresponding to a different one of the plurality of pending I/O operation queues is initialized to a particular max TTE associated with the different one of the plurality of pending I/O operation queues.

17. The non-transitory computer readable medium of claim 16, wherein said selecting includes:

selecting an initial queue of the plurality of pending I/O operation queues in accordance with the service level objective and the max TTE associated with the initial queue;

determining whether the initial queue has an associated RC that is greater than or equal to the EET of the I/O operation and an associated current TTE that is greater than or equal to the EET of the I/O operation; and if it is determined the initial queue does have an associated RC that is greater than or equal to the EET of the I/O operation and an associated current TTE that is greater than or equal to the EET of the I/O operation, determining the initial queue as the first queue wherein said inserting inserts the I/O operation into the initial queue and decreasing the associated RC of the initial queue in accordance with the EET of the I/O operation.

18. The non-transitory computer readable medium of claim 17, wherein the method further comprises:

if it is determined the initial queue does not have an associated RC that is greater than or equal to the EET of the I/O operation and an associated current TTE that is greater than or equal to the EET of the I/O operation, traversing remaining queues of the plurality of pending I/O operation queues in accordance with the ranking of the plurality of pending I/O operation queues to determine the first queue having an associated RC that is greater than or equal to the EET of the I/O operation and an associated current TTE that is greater than or equal to the EET of the I/O operation; and decreasing the RC of the first queue in accordance with the EET of the I/O operation inserted into the first queue.

19. The non-transitory computer readable medium of claim 18, wherein said performing I/O operation shifting, includes;

shifting one or more I/O operations from the highest priority queue of the plurality of pending I/O operation queues to one or more threads that execute the one or more I/O operations from the highest priority queue; and for each of the one or more I/O operations shifted out of the highest priority queue, decreasing the RC of the highest priority queue in accordance with one or more EETs respectively associated with the one or more I/O operations shifted out of the highest priority queue.

20. The non-transitory computer readable medium of claim 19, wherein a sum of the one or more EETs associated with the one or more I/O operations shifted out of the highest priority queue does not exceed the max TTE value of the highest priority queue.

* * * * *